United States Patent [19]

Kindgren et al.

[11] 4,061,064
[45] Dec. 6, 1977

[54] APPARATUS FOR FORMING HOLES IN THE FLANGES OF STRUCTURAL MEMBERS

[75] Inventors: Lee Kindgren, Rockford; James P. Swanson, Winnebago, both of Ill.

[73] Assignee: W. A. Whitney Corporation, Rockford, Ill.

[21] Appl. No.: 746,603

[22] Filed: Dec. 1, 1976

[51] Int. Cl.² ............................................. B26F 1/02
[52] U.S. Cl. ........................................ 83/368; 83/560; 408/13
[58] Field of Search ...................... 83/71, 368, 560; 408/13

[56] References Cited

U.S. PATENT DOCUMENTS

| 3,817,135 | 6/1974 | Valente | 83/368 |
| 3,892,154 | 7/1975 | Duffy | 83/368 |
| 3,919,907 | 11/1975 | Kindgren | 83/368 |

*Primary Examiner*—J. M. Meister
*Attorney, Agent, or Firm*—Leydig, Voit, Osann, Mayer & Holt, Ltd.

[57] ABSTRACT

Punch presses are positioned for punching holes at selected vertical locations in the flanges of I-beams, angle irons and channels by apparatus which utilizes a movable probe to determine the initial position of the presses and which further utilizes a reversible counter and a comparator to stop the presses after they have moved a selected distance from their initial position.

23 Claims, 7 Drawing Figures

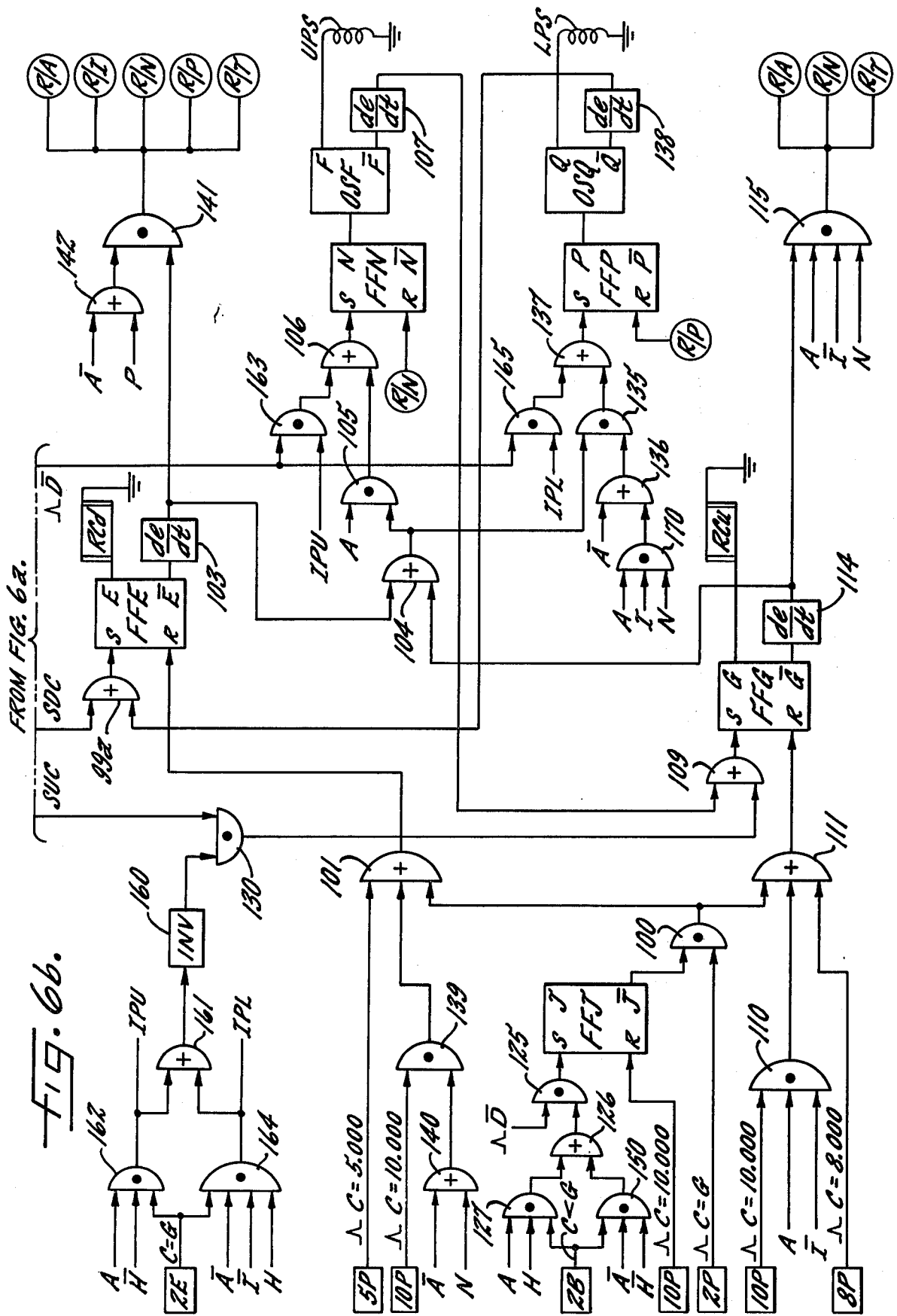

APPARATUS FOR FORMING HOLES IN THE FLANGES OF STRUCTURAL MEMBERS

BACKGROUND OF THE INVENTION

This invention relates to apparatus for forming holes in the upright flanges of elongated structural members such as I-beams, channels and angle irons of the type having a web joined to and projecting horizontally from the flange or flanges, the web actually being a horizontal flange in the case of an angle iron. More particularly, the invention relates to apparatus in which the holes are formed by upper and/or lower punch presses which are mounted on a vertically movable carriage. The upper press is used to punch holes in the upper flange of the I-beam and in the upwardly projecting flange of the angle iron while the lower press is used to punch holes in the lower flange of the I-beam and in the depending flange of the channel.

In the case of an I-beam, the particular vertical location of the holes in the flanges is conventionally spelled out in terms of gage line dimension with respect to a horizontal reference plane which bisects the web. According to conventional standards, the gage line dimension for an I-beam does not represent the actual spacing of a hole from the reference plane but instead is a dimensional number which is equal to twice the actual spacing of the hole from the reference plane. For an angle iron, the reference plane is defined by the lower surface of the horizontal flange while the gage line dimension represents the actual spacing of the hole above the reference plane. The reference plane of a channel coincides with the upper surface of the web and, in the case of a channel, the gage line dimension specifies the actual distance of the hole below the reference plane. Accordingly, the reference planes for the three different types of structural members lie in different locations with respect to the web or horizontal flange and, when dealing with an I-beam, the specified gage line dimension for a given hole is not the actual distance of the hole from the reference plane.

When a structural member is first advanced into position for punching, the reference plane most usually is located at an unknown elevation relative to the presses. Accordingly, it is necessary first to determine the location of the reference plane relative to the presses and then to position the presses in a proper vertical location with respect to the reference plane in order to effect punching of a hole at a specified gage line dimension. Determination of the location of the reference plane of an I-beam is particularly difficult since such plane bisects the web and thus any measurement gaged from a surface of the web must take one-half the vertical thickness of the web into account before the location of the reference plane can be ascertained. Also, the vertical thickness of the horizontal flange of an angle iron must be taken into account when finding the reference plane of the angle iron by measuring from the upper surface of the horizontal flange. In addition, the elevation of the reference plane may vary along the length of the structural member if the member is bowed in a vertical direction.

SUMMARY OF THE INVENTION

The general aim of the present invention is to provide new and improved apparatus of the foregoing character which is capable of automatically positioning the presses to properly punch holes at specified vertical locations in the flanges of structural members and which is capable of operating with equal facility on I-beams, angle irons and channels.

An important object of the invention is to provide apparatus which is capable of positioning the presses to selectively punch either the upper flange, the lower flange or both flanges of an I-beam, which takes into account the thickness of the web and any bowing of the I-beam when locating the reference plane, and which positions the presses at the proper vertical locations even though the locations of the holes are specified in terms of conventional gage line dimension rather than in terms of actual distance from the reference plane.

A related object is to provide apparatus for locating presses relative to the flanges of I-beams and capable of being programmed in terms of actual web thickness and standard gage line dimension.

A more detailed object is to provide apparatus in which the initial distance between the presses and the reference plane is detected and measured by a movable probe and is stored as a count in a reversible counter. After the probe has stopped, the carriage is automatically moved in the proper direction to shift the appropriate press toward the specified hole location. Such movement causes the count held by the counter to increase or decrease depending upon the direction of travel and, when the count becomes equal to the specified gage line dimension, the carriage is automatically stopped with the appropriate press positioned at the proper location for punching of the hole.

The invention also resides in the unique ability of the counter to change its count by either one unit or two units for each predetermined increment of travel by the probe or the carriage and by the ability of the counter to reverse its direction of counting and effect proper positioning of the presses under different circumstances and with the use of only a single probe.

These and other objects and advantages of the invention will become more apparent from the following detailed description when taken in conjunction with the accompanying drawings.

BRIEF DESCRIPTION OF THE DRAWINGS

FIGS. 6a and 6b, when joined as indicated, constitute a diagram of still another part of the control circuit.

DETAILED DESCRIPTION OF THE PREFERRED EMBODIMENT

Figure 1:
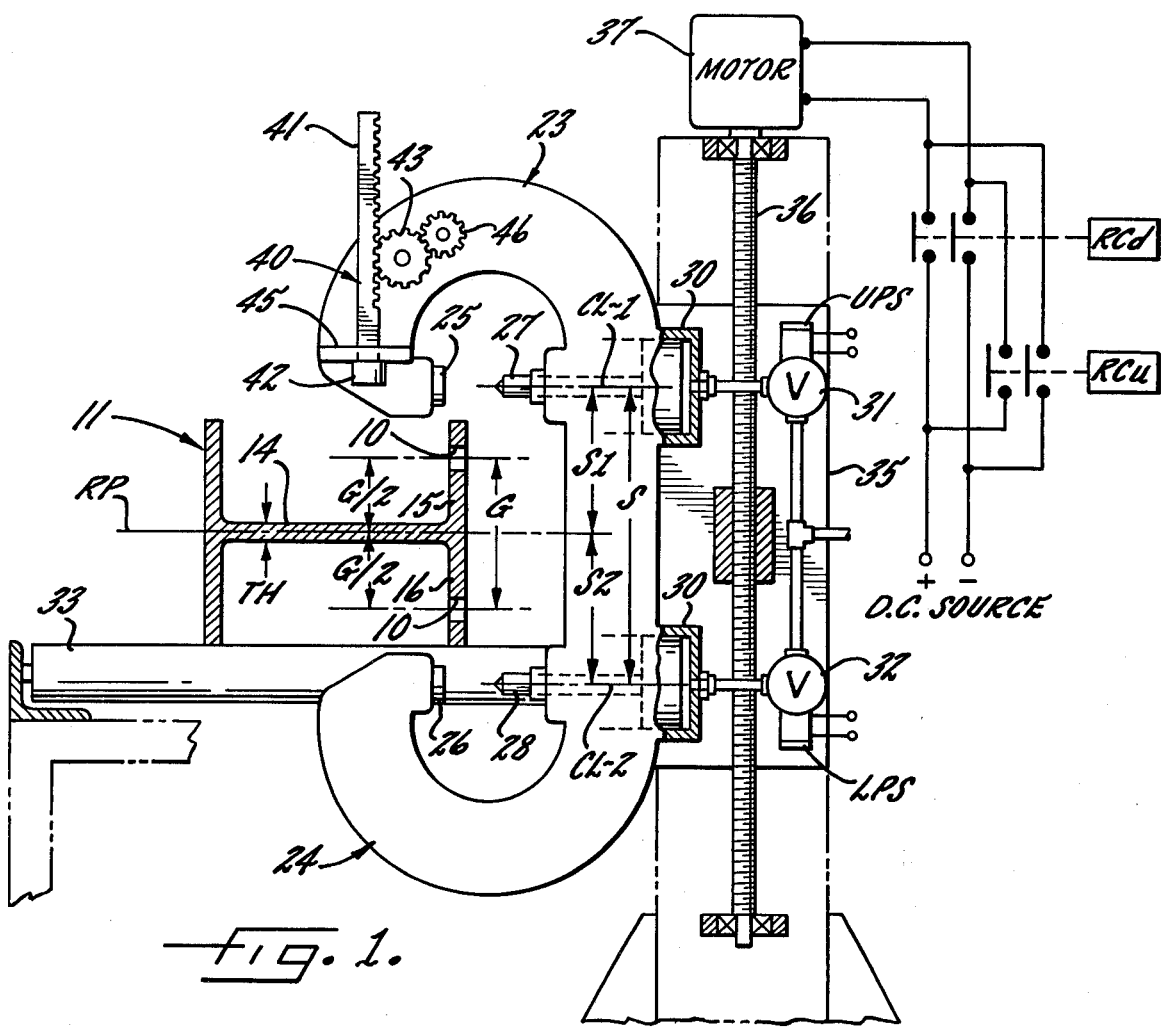
FIG. 1 is a view showing apparatus incorporating the features of the present invention in schematic side elevation and illustrating the apparatus in conjunction with an I-beam.
Figure 2:
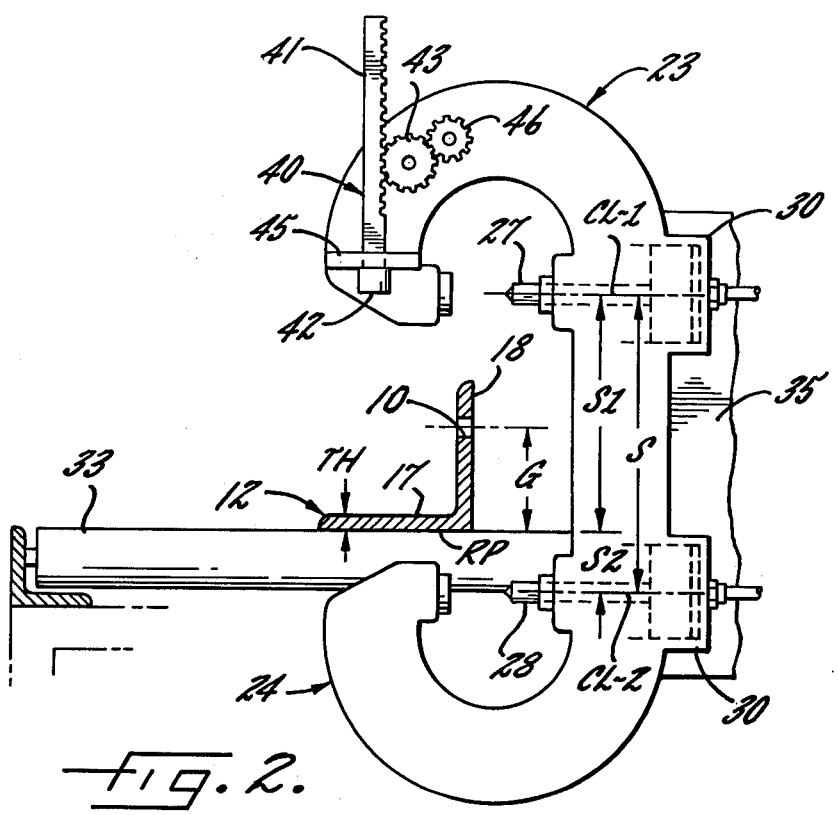
FIG. 2 is a simplified view similar to FIG. 1 but on a reduced scale and illustrating the apparatus in conjunction with an angle iron.
Figure 3:
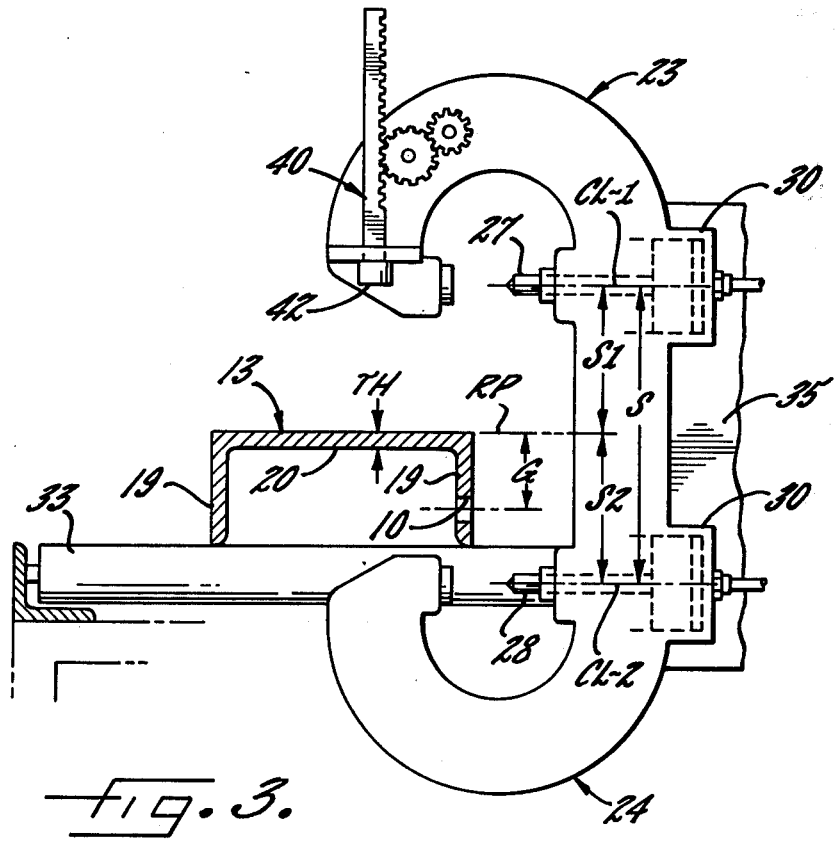
FIG. 3 is a view similar to FIG. 2 but illustrates the apparatus in conjunction with a channel.

As shown in the drawings for purposes of illustration, the invention is embodied in machine tool apparatus for forming holes 10 in elongated structural members, the holes herein being punched in the members. Three typical structural members are shown in FIGS. 1, 2 and 3 and comprise an I-beam 11, an angle iron 12 and a channel 13. The I-beam 11 includes inner and outer vertically extending legs spanned by a horizontal web 14 (FIG. 1) with each leg being defined by an upper flange 15 projecting upwardly from the web and by a lower flange 16 projecting downwardly from the web. The angle iron 12 is defined by a horizontal web or flange 17 (FIG. 2) and by an upwardly projecting vertical flange 18 while the channel 13 includes inner and outer flanges 19 (FIG. 3) projecting downwardly from a horizontal web 20. With the present machine tool apparatus, the holes 10 are punched in the upper and lower flanges 15 and 16 of the inner leg of the I-beam, in the vertical flange 18 of the angle iron, and in the inner flange 19 of the channel.

For the most part, the physical apparatus for forming the holes 10 is well known (see, for example, Kindgren U.S. Pat. No. 3,919,907) and thus the apparatus has been illustrated in a very schematic and simplistic form. In brief, such apparatus comprises upper and lower generally C-shaped punch presses 23 and 24 having fixed dies 25 and 26 and having horizontally reciprocable tools or punches 27 and 28 which coact with the dies to form the holes. The horizontal centerlines CL-1 and CL-2 of the upper and lower punches 27 and 28, respectively, are spaced vertically from one another by a fixed distance S which, in the present instance, is 10.000 inches.

Figure 6A:
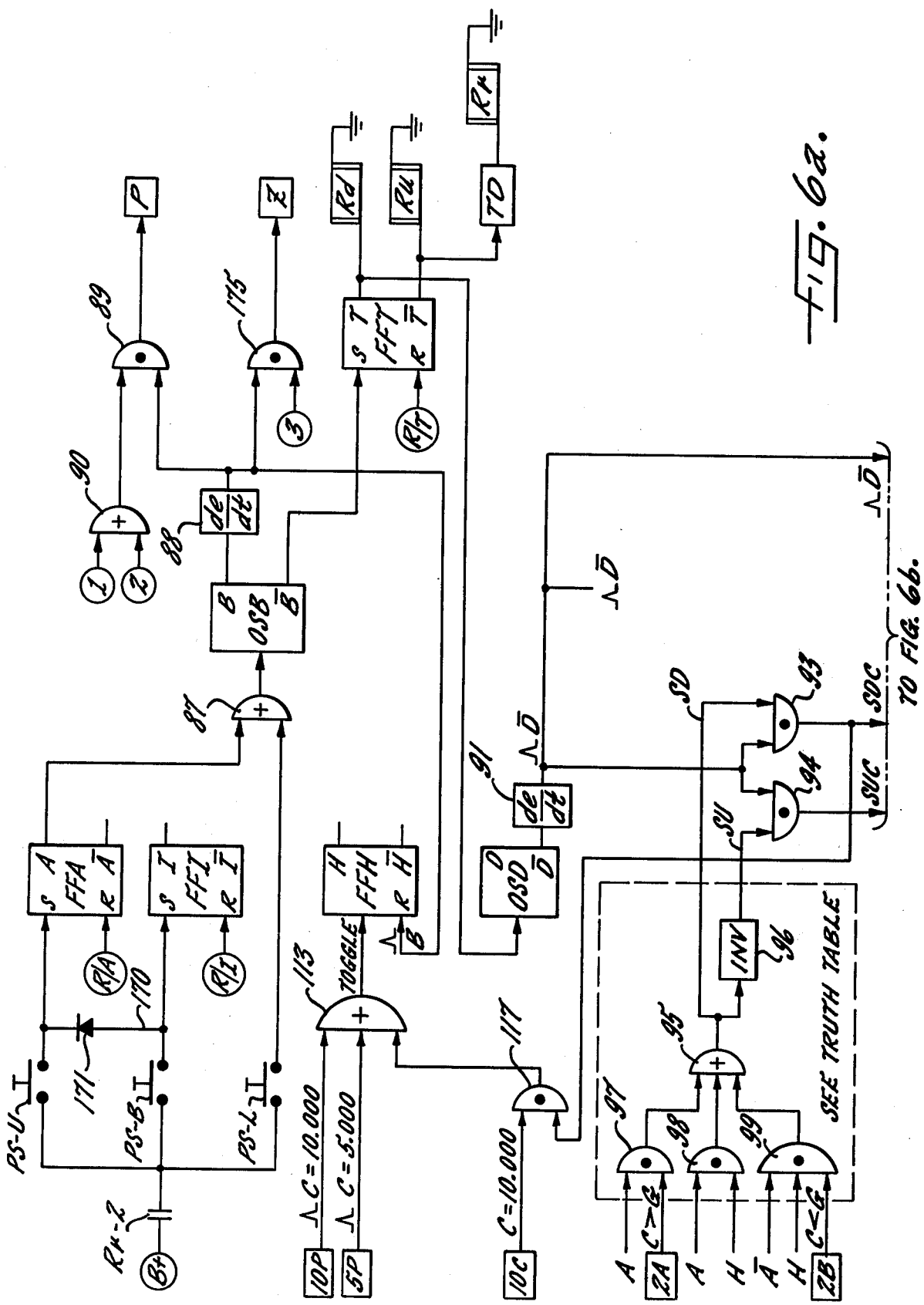

The punches 27 and 28 are adapted to be advanced through punching strokes by hydraulic actuators 30 (FIG. 1) and are respectively advanced when upper and lower punch solenoids UPS and LPS (FIGS. 1 and 6b) are energized. Energization of the solenoids effects the shifting of control valves 31 and 32 (FIG. 1) to positions admitting pressure fluid into the appropriate ends of the actuators to advance the punches.

Figure 4:
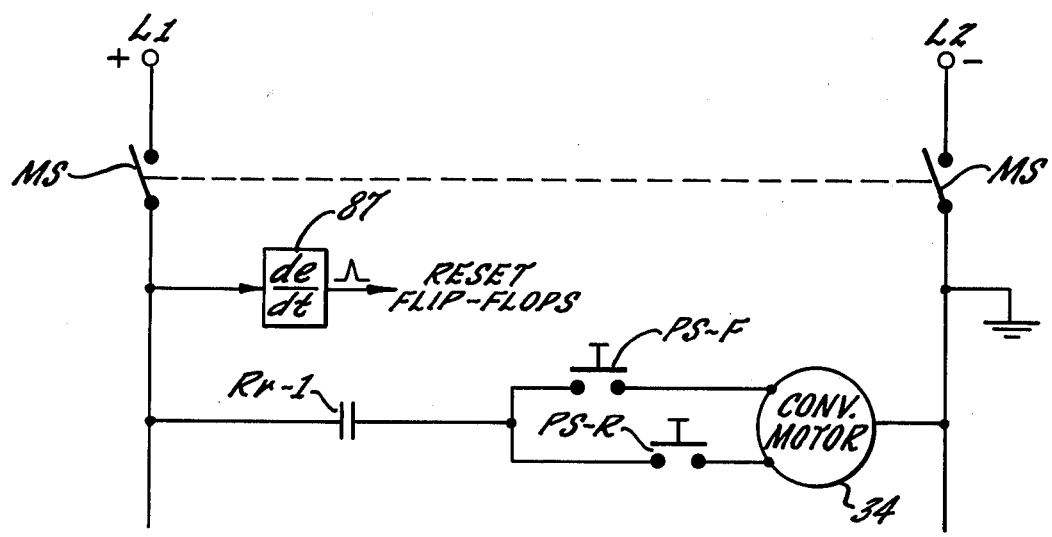
FIG. 4 is a diagram of part of the control circuit for the apparatus.

The upper press 23 is used to form the holes 10 in the upper flange 15 of the I-beam 11 and in the vertical flange 18 of the angle iron 12 while the lower press 24 is used to form the holes in the lower flange 16 of the I-beam and in the inner flange 19 of the channel 13. To enable the holes to be punched at various locations along the length of each of the members 11, 12 and 13, a power-driven roller conveyor 33 is positioned adjacent the presses 23 and 24 and supports the member for advancement past the presses, the conveyor being periodically stopped to permit one or more holes to be punched in the member. The I-beam 11 and the channel 13 are supported on the conveyor with the lower edges of their flanges 16 and 19, respectively, resting on the conveyor (see FIGS. 1 and 3) while the angle iron 12 is supported with its horizontal flange 17 resting on the conveyor and with its vertical flange 18 projecting upwardly as shown in FIG. 2. The conveyor is driven by a reversible motor 34 (FIG. 4) adapted to be energized from power lines $L_1$ and $L_2$ and adapted to advance the conveyor either forwardly or reversely when push button switches PS-F and PS-R are respectively closed.

It is necessary to be able to form holes 10 at various points along the heights of the flanges 15, 16, 18 and 19 and, for this purpose, the presses 23 and 24 are supported for vertical shifting so that the centerlines CL-1 and CL-2 of the upper and lower punches 27 and 28, respectively, may be located at different vertical positions relative to the flanges. Herein, vertical shifting of the presses is achieved by mounting both presses on a common carriage 35 (FIG. 1) which is adapted to move upwardly or downwardly in response to rotation of a lead screw 36 in one direction or the other. Rotation of the lead screw is effected by a drive mechanism such as a reversible motor 37 connected to be energized from a suitable dc. voltage source in such a manner as to drive the carriage 35 downwardly in response to energization of a relay $RC_d$ (FIGS. 1 and 6b) and upwardly in response to energization of a relay $RC_u$. A gap exists in the conveyor 33 immediately adjacent the presses so that the lower press 24 may move upwardly to locate the lower punch 28 above the conveyor and in a position to form holes in the lower flange 16 of the I-beam 11 or the flange 19 of the channel 13.

The vertical locations of the holes 10 in the flanges 15, 16, 18 and 19 are spelled out in terms of gage line dimension G. In accordance with industry standards, the gage line dimension G for an I-beam 11 is specified to be the vertical distance between two holes spaced equidistantly from a reference plane RP (FIG. 1) defined by the neutral horizontal plane which bisects the web 14. Stated differently, the gage line dimension G for a given hole in an I-beam is equal to twice the vertical distance G/2 between the centerline of the hole and the neutral or reference plane RP. Thus, if a hole 10 is to be punched in the upper flange 15 a distance of 3.000 inches above the reference plane RP, the specified location for the hole in terms of gage line dimension G is 6.000 inches regardless of whether a hole spaced equidistantly below the reference plane is to be punched in the lower flange 16 at the same lengthwise location along the beam. When provided with instructions for punching an I-beam, the press operator is not given the actual vertical distance between a given hole and the reference plane RP but instead is given the gage line dimension G.

For the angle iron 12, the gage line dimension G is defined as the actual vertical distance between the centerline of the hole 10 in the vertical flange 18 and a horizontal reference plane RP (FIG. 2) coinciding with the lower surface of the horizontal flange 17. The gage line dimension G for the channel 13 is the actual vertical distance between the centerline of the hole in the flange 19 and a horizontal reference plane RP lying in the same plane as the upper surface of the web 20. Thus, a gage line dimension G of 3.000 inches for an angle iron means that a hole is to be located 3.000 inches above the lower surface of the lower flange 17 while a corresponding gage line dimension for a channel means that a hole is to be located 3.000 inches below the upper surface of the web 20.

When the conveyor 33 first advances one of the members such as the I-beam 11 into the proper lengthwise position for punching of the initial hole 10, the centerlines CL-1 and CL-2 of the presses 23 and 24 can be located in various vertical positions relative to the web 14 and the reference plane RP, it being necessary only that the presses be located in such position as to leave the web free to move between the presses. If it be assumed, for example, that the reference plane RP of the beam is located a distance of 5.000 inches above the top of the conveyor and that the fixed vertical spacing S between the two centerlines CL-1 and CL-2 of the presses is —as stated — 10.000 inches, the vertical spacing $S_1$ (FIG. 1) between the upper centerline CL-1 and the reference plane could be 4.000 inches while the vertical spacing $S_2$ between the lower centerline CL-2 and the reference plane could be 6.000 inches. If the presses are in the same position relative to the conveyor but the reference plane RP of the beam is only 3.000 inches above the top of the conveyor, the vertical distances $S_1$ and $S_2$ would be 6.000 inches and 4.000 inches, respectively. Accordingly, the initial vertical position of the presses relative to the reference plane of the beam can vary within a wide range and the press operator cannot readily determine where the presses are located with respect to the reference plane and the flanges 15 and 16. In addition, the operator either knows or can easily determine the thickness TH of the web 14 but cannot readily locate the neutral or reference plane RP since that plane bisects and lies within the web. Moreover, the reference plane RP is not necessarily located at the same elevation along the entire length of the beam since the beam may be —and frequently is — bowed in a vertical direction and thus the location of the reference plane relative to the centerlines CL-1 and CL-2 of the presses 23 and 24 can vary along the length of the beam. All of these factors make it difficult to locate the presses at the proper vertical location to punch the holes 10 at the specified gage dimension G.

The present invention contemplates the provision of a unique and comparative simple system which controls vertical positioning of the presses 23 and 24 and which enables the presses to be automatically located to punch holes at different specified gage dimensions G regardless of the initial vertical location of the presses and the reference plane RP. The control system is particularly characterized by its ability to position the presses with equal facility with respect to I-beams 11, angle irons 12 and channels 13, by its ability to deal with standardized gage line dimensions G and actual web thicknesses TH, and by its ability to automatically cycle the presses to punch either the upper flange 15, the lower flange 16 or both flanges 15 and 16 of an I-beam 11.

Figure 5:
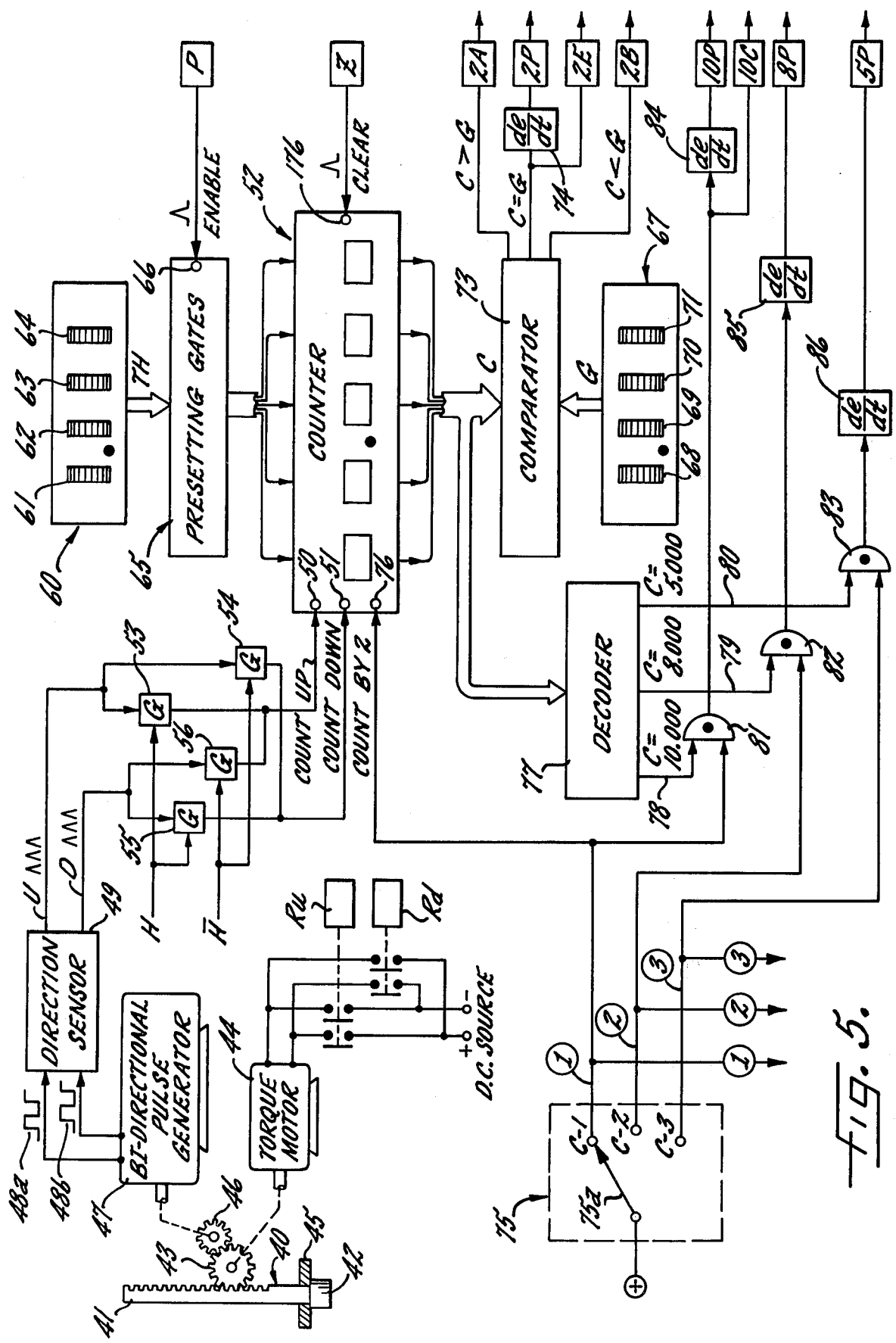
FIG. 5 is a diagram of another part of the control circuit for the apparatus.

Forming an important part of the control system is a gaging probe 40 (FIG. 1) which is adapted to measure the vertical distance between the upper centerline CL-1 and the upper surface of either the web 14 of the I-beam 11, the horizontal flange 17 of the angle iron 12 or the web 20 of the channel 13. Herein, the gaging probe is shown schematically as being an elongated upright rack 41 which is supported to move upwardly and downwardly on the upper press 23 and which carries a disc 42 on its lower end. The probe is advanced downwardly or retracted upwardly in response to rotation of a pinion 43 journaled on the upper press 23 and adapted to be driven by a mechanism such as a reversible torque motor 44 (see FIG. 5) which, even though energized, simply stalls when the probe is stopped either in its upper position or a lowered position. The motor 44 is supported on the upper press, is connected to a dc. voltage source, and is driven in a direction to advance the probe downwardly when a relay $R_d$ (FIGS. 5 and 6a) is energized and to retract the probe upwardly when a relay $R_u$ is energized.

When the probe 40 is advanced downwardly, the disc 42 engages and is stopped by the upper surface of the web 14, the flange 17 or the web 20. When the probe is retracted upwardly to a home position, the disc is stopped by a fixed abutment 45 (FIG. 1) on the upper press 23. The lower surface of the disc 42 is disposed precisely at the same level as the upper centerline CL-1 when the probe is in its home position.

Signals indicative of the displacement of the probe 40 from the centerline CL-1 of the upper press 23 are produced whenever the probe is advanced or retracted relative to the stationary carriage 35 and also whenever the carriage is moved relative to the stationary probe. For this purpose, a second pinion 46 (FIGS. 1 and 5) is geared to the pinion 43 and drives a bi-directional pulse generator 47 (FIG. 5) which produces two output signals 48a and 48b in the form of recurring square waves. Each of these output signals contains one complete cycle for each basic unit distance which the probe 40 travels relative to the carriage 35, for example, one cycle for each 0.001 inch of motion, irrespective of whether that motion is in a downward or upward direction. The signal 48a, however, either leads or lags the signal 48b in phase when the probe is moving downwardly or upwardly, respectively, relative to the carriage. These output signals are supplied to a direction sensor 49 which in turn produces first and second pulses D or U on its output terminals when the probe motion is in a downward or upward direction, respectively, relative to the stationary carriage. When the carriage 35 is moved downwardly relative to the stationary probe 40, pulses U are produced while pulses D are produced when the carriage is moved upwardly relative to the stationary probe. Whenever the carriage is moved relative to the stationary probe, the torque motor 44 is always energized in a direction to keep the probe pressed into contact with the web, and the pinion 43 simply turns in the appropriate direction to enable the carriage to move relative to the probe.

In carrying out the invention, the pulses U and D are routed to the count up or count down terminals 50 and 51 (FIG. 5) of a reversible counter 52. This counter comprises five decade stages connected in tandem, each such stage having four bistate devices or flip-flops interconnected by gates so as to signal in binary coded decimal notation on its four output lines (here shown as one line) any decimal value between 0 and 9 as 10 successive input pulses are suppled thereto. Carry output pulses from each stage are supplied as input pulses to the decade stage of the next highest order. Such reversible counters are well known in the art and need not be treated in detail here. It will suffice to note that the present counter 52 will count up, that is, increase the number stored therein in response to each pulse supplied to its count up input terminal 50 and will count down or decrease the stored number in response to each pulse supplied to its count down input terminal 51. The present counter is capable of counting from zero to 10.000 or vice versa in increments of 0.001.

For a reason to be explained subsequently, the up pulses U and the down pulses D sometimes are supplied to the count up and count down terminals 50 and 51, respectively, of the counter 52 and, at other times, the up pulses U and the down pulses D are supplied to the count down and count up terminals 51 and 50, respectively. For this purpose, the up pulses U are routed to the counter through a pair of transmission gates 53 and 54 (FIG. 5) while the down pulses D are supplied to the counter through a second pair of transmission gates 55 and 56. The gates are controlled by signals H and H which may be considered as binary signals. Each of the signals H and H may have either a high or binary "1" level or a low or binary "0" level and only one of the signals H and H is at an effective or "1" level at any given time. A flip-flop FFH (FIG. 6a) is employed to produce the signals H and H at a binary "1" level when the flip-flop is respectively in its set or reset state. Thus, the signal H is at a "1" level and the signal H is at a "0" level when the flip-flop FFH is in its set state while the signal H is at a "1" level and the signal H is at a "0" level when the flip-flop is in its reset state.

When the signal H is at a "1" level, the gates 53 and 55 are enabled and thus the up pulses U from the direction sensor 49 are routed to the count up terminal 50 of the counter 52 while the down pulses D are routed to the count down terminal 51. Conversely, the gates 54 and 56 pass the pulses U and D when the signal H is at a "1" level and, under this condition, the up pulses U and the down pulses D are supplied to the count down and count up terminals 51 and 50, respectively, of the counter 52.

It will be helpful here to restate that down pulses D are produced whenever the carriage 35 is stationary and the probe 40 is advanced downwardly and that up pulses U are produced whenever the carriage is stationary and the probe is retracted upwardly. Whenever the probe is stationary, however, down pulses D are produced when the carriage is moved upwardly while up pulses U are produced when the carriage is moved downwardly. The flip-flop FFH normally is in a reset state so that the signal H normally is at a "1" level and thus down pulses D produced either by (a) downward movement of the probe 40 relative to the stationary carriage 35 or (b) upward movement of the carriage relative to the stationary probe are routed through the gate 56 to the count up terminal 50 of the counter 52 so as to increase the count held by the counter. By the same token, up pulses U normally are supplied through the gate 54 to the count down terminal 51 of the counter and reduce the count held therein whenever (a) the probe moves upwardly relative to the stationary carriage or (b) the carriage moves downwardly relative to the stationary probe. This may be referred to as the "normal" mode of counting since this mode prevails when the flip-flop FFH is in its normal or reset state and the signals H and H are at their normal "1" and "0" levels, respectively.

A so-called "reverse" mode of counting takes place whenever the flip-flop FFH is in its set state and the signal H is at a "1" level. That is to say, the down pulses D produced either by (a) downward movement of the probe relative to the stationary carriage or (b) upward movement of the carriage relative to the stationary probe are routed through the gate 55 to the count down terminal 51 of the counter 52 to reduce the count stored in the counter. Up pulses U resulting either from (a) upward movement of the probe relative to the stationary carriage or (b) downward movement of the carriage relative to the stationary probe are supplied to the count up terminal 50 of the counter via the gate 53 and increase the count held by the counter. Table I which appears below summarizes the direction of counting when relative motions occur between the probe and the carriage in the "normal" and "reverse" counting modes.

TABLE I

| Direction Of Relative Movement Of Probe And Carriage | "Normal" Counting Mode (H = "1") | "Reverse" Counting Mode (H = "1") |
|---|---|---|
| Probe moves down relative to stationary carriage | Count Up | Count Down |
| Probe moves up relative to stationary carriage | Count Down | Count Up |
| Carriage moves down relative to stationary probe | Count Down | Count Up |
| Carriage moves up relative to stationary probe | Count Up | Count Down |

Further in keeping with the invention, means 60 (FIG. 5) are provided to enable the thickness TH of the I-beam web 14 or the angle iron flange 17 to be taken into account when the presses 23 and 24 are positioned vertically. While the means 60 could take various forms, they herein include four thumbwheel switches 61, 62, 63 and 64 which the press operator may manipulate to dial in a thickness TH ranging from zero to 9.999 inches. When a bank of presetting gates 65 is momentarily enabled by a pulse P applied to a terminal 66, signals TH representative of the thickness dialed in on the thumbwheel switches are routed to the counter 52 and set the count at the value of the thickness. Thus, the numerical value of the thickness TH of the I-beam web 14 or the angle iron flange 17 may be preset into the counter so that the presses 23 and 24 may be positioned properly with respect to I-beams 11 and angle irons 12 having webs 14 or flanges 17 of different thicknesses.

Means 67 (FIG. 5) also are provided to enable the press operator to establish the gage line dimension G at which a given hole 10 is to be punched. These means, which also may take various forms, herein are shown as comprising four thumbwheel switches 68, 69, 70 and 71 which enable the operator to manually dial in a gage line dimension G ranging from 0 to 9.999 inches. A signal G representative of the selected gage line dimension is supplied from the switch bank 67 to a comparing device 73 which also receives a signal C representative of the count held by the counter 52. The comparing device may take different forms known to those skilled in the art, and it functions to produce different binary "1" level output signals depending upon the relative value of the input signals C and G to the comparator. When the count signal C is greater than the gage signal G, the comparator 73 produces a binary "1" output signal 2A (FIG. 5) and, when the count signal C is less than the gage signal G, the comparator produces a binary "1" output signal 2B. When the signal C is precisely equal to the signal G, the comparator produces a binary "1" signal 2E and further produces a signal which is routed through a time differentiating circuit or differentiator 74 and which appears at the output of the differentiator as a momentary pulse 2P.

Provision also is made for the press operator to set the control system to different states in accordance with whether the holes 10 are to be punched in an I-beam 11, an angle iron 12 or a channel 13. In the present instance, this is achieved by way of a selector switch 75 (FIG. 5) having a wiper 75a which may be moved manually to make any one of three contacts C-1, C-2 or C-3 and to apply a voltage signal to any one of three output lines 1, 2 or 3. The operator sets the wiper in first, second or third positions (i.e., the wiper makes the contacts C-1, C-2 or C-3) whenever the punching operations are being performed on an I-beam 11, an angle iron 12 and a channel 13, respectively.

Importantly, the operation of the counter 52 is modified whenever an I-beam 11 is being punched and the wiper 75a of the selector switch 75 is located in its first position to cause a voltage signal to be applied to the output line 1. Such signal is transmitted to a terminal 76 of the counter 52 and causes the counter to count by two so that the count C held by the counter changes by twice its normal value each time a pulse D or U is received on the count up terminal 50 or the count down terminal 51 of the counter. Whenever the wiper is in its second or third positions (i.e., making the contacts C-2 or C-3), the count held by the counter changes by .001 each time a pulse is received on the terminal 50 or the terminal 51. If, for example, the counter is holding a count of 5.616 and four pulses are applied to the count up terminal 50 while the wiper is in its second or third position, the count will increase to 5.620. If, however, the wiper is in its first position, each pulse will cause the count to change by 0.002 and thus the count will increase from 5.616 to 5.624 upon the receipt of four pulses by the count up terminal. The ability of the counter 52 to count by two when an I-beam is being punched is important —as will become more apparent subsequently— in that it allows the initial distance between the reference plane RP and the centerline CL-1 of the upper press 23 to be determined regardless of the thickness TH of the web 14 and even though the probe 40 can travel only through the distance between the centerline CL-1 and the upper surface of the web 14 and cannot reach the actual reference plane. Moreover, the ability of the counter to count by two enables the presses 23 and 24 to be positioned at the proper vertical location for punching of a hole even though the gage signal G represents twice the actual distance G/2 of the hole from the reference plane.

The count signal C produced by the counter 52 also is supplied to a decoder 77 (FIG. 5) which is operable to produce output signals when the count C reaches certain predetermined values, the decoder herein producing signals on output lines 78, 79 and 80 when the count is at 10.000, 8.000 and 5.000, respectively. The three output lines 78, 79 and 80 of the decoder are coupled to AND gates 81, 82 and 83, respectively, whose other inputs are respectively connected to the output lines 1, 2 and 3 from the selector switch 75. When the count C reaches a value of 10.000 and the switch wiper 75a is in its first position and making the contact C-1, the signals on the lines 78 and 1 cause a binary "1" signal 10c to be supplied from the gate. The output of the gate 81 also is routed through a differentiator 84 which produces a momentary output pulse 10p when the count C first reaches a value of 10.000 and the switch wiper is in its first position.

The gate 82 acts in conjunction with a differentiator 85 to produce a momentary output pulse 8p when the count C attains a value of 8.000 and the selector switch wiper 75a is in its second position closing the contact C-2 to effect punching of an angle iron 12. When the contact C-3 is closed as a result of the wiper 75a being in its third position for punching of a channel 13, a momentary pulse 5p is produced by the gate 83 and a differentiator 86 when the count C reaches 5.000.

Let it be assumed that the press operator wishes to punch a hole 10 in the upper flange 15 of the I-beam 11 at a given lengthwise location and at a gage line dimension G of 6.000 inches, the hole thus to be located a distance G/2 of 3.000 inches above the reference plane RP of the beam. Let it further be assumed that the web 14 of the beam has a thickness TH of 1.000 inch and that the spacing $S_1$ between the reference plane RP and the centerline CL-1 of the upper press 23 initially is 4.000 inches when the beam is placed on the conveyor 33. Finally, let it be assumed that the probe 40 is in its uppermost or home position with its lower end at the same level as the upper centerline CL-1 and thus also is spaced 4.000 inches above the reference plane.

To first bring power to the system, the press operator closes main switches MS (FIG. 4) in the lines $L_1$ and $L_2$. When the switches are closed, a differentiator 87 produces a pulse which resets the flip-flop FFH and which also resets a flip-flop FFT (FIG. 6a) and all of the other flip-flops to be referred to subsequently. Upon resetting, the flip-flop FFT produces a high level signal T which energizes a relay $R_r$ to effect closure of relay contacts $R_r$-1 and $R_r$-2. Closure of the contacts $R_r$-1 (FIG. 4) permits the press operator to energize the conveyor motor 34 by closing either the switch PS-F or the switch PS-R and thus the operator may advance the beam to the proper lengthwise location. When the contacts $R_r$-2 close (FIG. 6a), voltage is supplied from a suitable source to three push button switches PS-U, PS-B and PS-L. The switch PS-U is adapted to be closed manually when a hole 10 is to be punched only in the upper flange 15 of the I-beam 11 or the flange 18 of the angle iron 12, the switch PS-B is adapted to be closed when holes are to be punched in both the upper and lower flanges 15 and 16 of the I-beam at the same gage line dimension and the same lengthwise location, and the switch PS-L is adapted to be closed when a hole is to be punched only in the lower flange 16 of the I-beam or in the flange 19 of the channel 13.

After advancing the beam 11 to the proper lengthwise position, the press operator manually dials in the web thickness TH of 1.000 inch on the thumbwheel switches 61 to 64, dials in the gage line dimension G of 6.000 inches on the thumbwheel switches 68 to 71, and moves the selector switch wiper 75a to its first position on the contact C-1 to set the system for the punching of an I-beam. The operator then initiates the press positioning and punching cycle by momentarily closing the push button switch PS-U.

Closure of the push button switch PS-U sets a flip-flop FFA (FIG. 6a) to produce a binary "1" signal A which is supplied as an input to an OR gate 87. The signal passes the gate and triggers a monostable or "one-shot" multivibrator OSB. Upon being triggered, the one shot OSB produces a signal B which is routed to a differentiator 88 that supplies a pulse to the reset terminal of the flip-flop FFH to insure that the signal H will be high and that the counter 52 will always be in its "normal" counting mode prior to any downward movement of the probe 40 and the carriage 35.

The pulse from the differentiator 88 also is supplied as one input of an AND gate 89 whose other input is supplied through an OR gate 90 and is constituted by the signals 1 or 2 from the selector switch 75. Since the signal 1 is at a high level when the gate 89 receives the pulse from the differentiator 88, the pulse is transmitted by the gate 89 as the pulse P which is applied to the terminal 66 of the presetting gates 65 to enable the latter. The numerical value of the web thickness TH thus is preset into the counter 52 so that the latter will be cleared of any prior count and will register a count C of 1.000.

After a sufficient time interval has elapsed to enable the counter 52 to be preset with the value of TH, the one-shot OSB times out and produces a signal B at a binary "1" level to set the flip-flop FFT and cause the signal T to go low and a signal T to go high. When the signal T goes low, the relay $R_r$ is de-energized to open the relay contacts $R_r$-1 and $R_r$-2 and prevent any advance of the conveyor 33 and also to disable the push button switches PS-U, PS-B and PS-L during the remainder of the punching cycle. A suitable time delay circuit TD is provided in order to keep the relay $R_r$ energized for a short time after setting of the flip-flop FFT.

The binary "1" signal T picks up the relay $R_d$ to energize the torque motor 44 in a direction to advance the probe 40 downwardly relative to the carriage 35 and toward the web 14 of the beam 11. Since the flip-flop FFH is in its reset state, the signal H is at a "1" level and thus the counter 52 is in its "normal" counting mode. Accordingly, the down pulses D produced by downward movement of the probe 40 are routed through the transmission gate 56 to the count up terminal 50 of the counter 52 to increase the count C held by the counter. And, since the selector switch wiper 75a is in its first position and is closing the contact C-1, the signal on the line 1 is applied to the terminal 76 of the counter and causes the counter to count by two or to increase its count by 0.002 for each pulse received on the count up terminal 50.

The probe 40 engages the web 14 after the probe has been advanced downwardly a distance of 3.500 inches, that is, a distance equal to the difference between (i) the initial spacing $S_1$ of the probe 40 from the reference plane RP and (ii) one-half the thickness TH of the web. In advancing through that distance, the probe causes the counter 52 to increase its count from 1.000 and to count by two to a value of 8.000. When the probe stops against the web, the torque motor 44 remains energized and simply stalls to urge the probe into contact with the web.

The signal T resulting from setting of the flip-flop FFT also is supplied to and serves to trigger a one-shot OSD. After a suitable time delay to enable the probe 40 to advance downwardly into contact with the web 14, the one shot OSD times out and its output is supplied to a differentiator 91 which produces a momentary pulse D. The latter is supplied as one input to a pair of AND gates 93 and 94. The second input to the gate 93 is a signal SD while the second input to the gate 94 is a signal SU. Both the signal SD and the signal SU originate from the output of an OR gate 95 but that output is inverted as indicated at 96 with respect to the signal SU so that the signal SU is always at a "0" level whenever the signal SD is at a "1" level and is always at a "1" level whenever the signal SD is at a "0" level. Stated differently, the signal SD is at a "1" level and the signal SU is at a "0" level whenever the output of the gate 95 is at a "1" level and, conversely, the signal SD is at a "0" level and the signal SU is at a "1" level whenever the output of the gate 95 is at a "0" level.

When the conditions described above prevail, the output signal from the OR gate 95 is at a binary "1" level since, under such conditions, at least one of three inputs to the gate is at a "1" level. The three inputs are constituted by the outputs of three AND gates 97, 98 and 99. The inputs to the gate 97 are formed by the signal A from the flip-flop FFA and by the signal 2A which the comparator 73 produces whenever the count C is greater than the gate line dimension G, while the inputs to the gate 98 are formed by the signals A and H from the flip-flops FFA and FFH, respectively. The inputs to the gate 99 are constituted by the signals A and H and by the signal 2B which the comparator produces whenever the count C is less than the gate line dimension G. The truth table set forth below illustrates the states which the signals SD and SU take on for different states of the signals A, A, H, 2A and 2B.

TRUTH TABLE

| A | $\overline{A}$ | H | 2A C>G | 2B C<G | SD | SU |
|---|---|---|---|---|---|---|
| 0 | 1 | 1 | 0 | 1 | 1 | 0 |
| 1 | 0 | 1 | 0 | 1 | 1 | 0 |
| 1 | 0 | 0 | 1 | 0 | 1 | 0 |

TRUTH TABLE-continued

| A | $\overline{A}$ | H | 2A C>G | 2B C<G | SD | SU |
|---|---|---|---|---|---|---|
| 1 | 0 | 1 | 1 | 0 | 1 | 0 |
| 0 | 1 | 0 | 0 | 1 | 0 | 1 |
| 0 | 1 | 0 | 1 | 0 | 0 | 1 |
| 0 | 1 | 1 | 1 | 0 | 0 | 1 |
| 1 | 0 | 0 | 0 | 1 | 0 | 1 |

In the example given, the signal A is high as a result of the flip-flop FFA being set while the signal 2A from the comparator 73 also is high as a result of the count C (8.000) being greater than the gage dimension G at the time the pulse D is produced by the differentiator 91. Accordingly, a binary "1" signal passes the gates 97 and 95 to disqualify the gate 94 and, along with the pulse D, to enable the gate 93. The latter thus transmits a pulse SDC which passes an OR gate 99a to set a flip-flop FFE.

When set, the flip-flop FFE produces a high level signal E which picks up the relay $RC_d$ for energizing the carriage motor 37 in a direction to move the carriage 35 downwardly. Thus, the carriage and the upper press 23 begin moving downwardly to cause the direction sensor 49 to produce up pulses U. Since the counter 52 is in its "normal" counting mode, the pulses U are routed through the gate 54 to the count down terminal 51 of the counter to cause the counter to reduce the count C by 0.002 for each pulse received. When the count C is reduced to a value (i.e., 6.000) exactly equal to the gage line dimension G, the flip-flop FFE is automatically reset—in a manner to be explained subsequently—to de-energize the relay $RC_d$ and stop downward movement of the press carriage 35.

It should be noted that the count C was at 8.000 when the carriage 35 first started downwardly and was reduced to 6.000 when the carriage stopped. The count thus decreased by an increment of 2.000, indicating that downward movement of the carriage produced 1,000 pulses. Since each pulse is representative of a displacement of 0.001 inch, the carriage 35 thus moved downwardly a distance of 1.000 inch and decreased the spacing $S_1$ between the upper press centerline CL-1 and the reference plane RP from 4.000 to 3.000 inches. Accordingly, the centerline CL-1 of the upper press 23 is located exactly 3.000 inches above the reference plane so that a hole 10 may be punched in the upper flange 15 at a distance G/2 of 3.000 inches or one-half the specified gage line dimension G of 6.000 inches.

The function of the counter during movement of the probe 40 and subsequent movement of the carriage 35 can be summarized more generally by noting that the count C stood at the value of the web thickness TH prior to downward movement of the probe 40. The probe moved downwardly a distance of $S_1 - \frac{1}{2}TH$ to contact the web 14 and, since the counter 52 counted up by two during such movement, the count C increased by a value equal to $2(S_1 - \frac{1}{2}TH)$. At the time the probe stopped, the count C thus could be expressed as:

$$C = TH + 2(S_1 - \tfrac{1}{2}TH) \tag{1}$$

or more simply as:

$$C = TH + 2S_1 - TH = 2S_1 \tag{2}$$

Accordingly, by being preset with the actual web thickness TH and then counting by two, the counter completely eliminated the factor introduced by the web thickness and produced by a count C whose value is a function of the initial distance $S_1$ between the upper press centerline CL-1 and the reference plane RP through the center of the web 14 even though the web thickness prevented the probe 40 from moving through the distance $S_1$ and reaching the reference plane.

Now, when the carriage 35 thereafter moved downwardly and stopped, the count C decreased from a value of $2S_1$ to a value of G. Since the counter 52 counted down by two, the number of pulses received by the counter during downward movement of the carriage was equal to one-half of the change in the count C or was equal to $\frac{1}{2}(2S_1 - G)$. The latter quantity is representative of the distance through which the carriage moved downwardly from its initial position any may be expressed more simply as $S_1 - G/2$. The final spacing of the centerline CL-1 of the upper press 23 from the reference plane equals the initial spacing minus the distance moved and thus may be defined as $S_1 - (S_1 - G/2)$ or more simply as $G/2$. Thus, by counting by two during downward movement of the carriage, the counter 52 effected proper positioning of the upper centerline CL-1 for punching of the hole at an actual spacing of G/2 from the reference plane RP even though the location of the hole was specified to the press operator in terms of twice the actual spacing (i.e., in terms of standard gage line dimension G) and even though the operator dialed in the gage line dimension G on the thumbwheel switches 68 to 71.

As stated above, downward movement of the carriage 35 stops in response to the flip-flop FFE being reset when the count C becomes equal to the gage line dimension G. At that time, the comparator 73 produces the output pulse 2P and the latter is supplied as one input to an AND gate 100 (FIG. 6b). The other input signal to the gate, a signal J from a flip-flop FFJ is at a high level as a result of the flip-flop FFJ being in its reset state. As a result, the pulse 2P passes the AND gate 100 and an OR gate 101 to reset the flip-flop FFE.

Upon resetting, the flip-flop FFE supplies a high level signal E to a differentiator 103 (FIG. 6b) which produces a pulse that is routed through an OR gate 104, then an AND gate 105 (whose other input signal is constituted by the signal A) and thence through another OR gate 106 to set a flip-flop FFN. The resulting output signal N from the latter flip-flop triggers a one-shot OSF which produces a binary "1" signal F for energizing the solenoid UPS, such energization causing the punch 27 of the upper press 23 to advance through its punching stroke and form the hole 10 in the upper flange 15. After sufficient time has elapsed for completion of the punching stroke, the one-shot OSF times out and supplies a high level signal F to a differentiator 107 which produces a pulse that is routed through an OR gate 109 to set a flip-flop FFG. The latter produces a high level signal G which picks up the relay $RC_u$ so as to energize the carriage motor 37 in a direction to move the carriage 35 upwardly.

As the carriage 35 moves upwardly, the counter 52 counts upwardly by two. When the count C reaches a value of 10.000 (i.e., a value equal to the spacing S between the centerlines CL-1 and CL-2), the decoder 77 produces the pulse 10p and that pulse is supplied to an AND gate 110 (FIG. 6b) which is in a qualified state as a result of the signal A and a signal I from a reset flip-flop FFI being at binary "1" levels. Accordingly, the pulse 10p from the decoder 77 passes the AND gate 110 and is routed through an OR gate 111 to reset the flip-flop FFG, drop out of the relay $RC_u$ and de-energize the carriage motor 37 to stop upward movement of the carriage 35. Since the count C increased by 4.000, the carriage 35 moved upwardly a distance of 2.000 inches to increase the spacing $S_1$ between the upper centerline CL-1 and the reference plane RP to 5.000 inches. Accordingly, the carriage 35 stops when the spacing $S_1$ equals the spacing $S_2$ or, stated differently, when the centerlines CL-1 and CL-2 of the upper and lower presses 23 and 24 are spaced equidistantly from the reference plane RP.

When the count C reaches 10.000, the pulse 10p from the decoder 77 is also routed through an OR gate 113 (FIG. 6a) to the switch or "toggle" of the terminals of the flip-flop FFH to set the flip-flop and cause its output signal H to switch a binary "1" level and thereby switch the counter 52 to its "reverse" counting mode. This is, however, of no consequence since the counter performs no further function until a new punching cycle is begun.

Upon being reset by the pulse 10p, the flip-flop FFG supplies a binary "1" signal G to a differentiator 114 (FIG. 6b) which produces a pulse that is supplied to an AND gate 115. The latter is qualified as a result of its other input signals A, I and N being at binary "1" levels and thus the gate passes the pulse to its output lines R/A, R/N and R/T to reset the flip-flops FFA, FFN and FFT, respectively. Upon resetting, the flip-flop FFT drops out the relay $R_d$ while its signal T picks up the relay $R_u$ to energize the torque motor 44 in a direction to retract the probe 40 upwardly until the probe engages the stop 45. The signal T also picks up the relay $R_r$ to close the relay contacts $R_r$-1 and $R_r$-2 and enable another cycle.

Now, let it be assumed that the operator advances the beam 11 and wishes to punch another hole in the upper flange 15 at the same gage dimension G of 6.000 inches. Let it further be assumed that the beam is perfectly straight and that the reference plane RP thus is located at the same elevation as in the previous example.

To start the cycle, the operator need only close the push button switch PS-U. When the probe 40 moves downwardly through a distance of 4.500 inches and engages the web 14, the count C of the counter 52 increases from its originally preset value of 1.000 to a value of 10.000. The pulse 10p thus is produced by the decoder 77 and is routed through the OR gate 113 to the flip-flop FFH to toggle the latter from its reset state to a set state and cause the signal H to go high. This switches the counter 52 from its "normal" counting mode to its "reverse" counting mode and, if left in the latter mode, the counter would count upwardly from 10.000 as the carriage 35 advances downwardly. The count C, therefore, could never become equal to the gate line dimension G to effect stoppage of the carriage.

Provision is made, however, to re-switch the counter 52 to its "normal" counting mode just after the counter switches to its "reverse" mode when the probe 40 engages the web 14 and the count C simultaneously reaches 10.000 and causes the decoder 77 to produce the pulse 10p. It will be recalled that the one-shot OSD times out and produces the pulse D after the probe engages the web and that the pulse D causes the gate 93 to produce the pulse SDC which sets the flip-flop FFE to initiate downward movement of the carriage 35. The signal SDC also is routed to an AND gate 117 (FIG. 6a) whose other input is constituted by the signal 10c produced by the decoder when the count C equals 10.000. The simultaneous presence of the pulse SDC and the high level signal 10c causes the AND gate 117 to transmit the pulse through the OR gate 113 to the toggle terminal of the flip-flop FFH to reset the latter. The signal H thus goes high to place the counter 52 in its "normal" mode and cause the counter to count down as the carriage 35 moves downwardly. Accordingly, the counter will count in the proper direction even though the counter was momentarily switched to its "reverse" counting mode by the pulse 10p when the probe 40 engaged the web 14 and the count C simultaneously reached 10.000.

Most usually, the beam 11 is not perfectly straight but instead is bowed vertically so that the reference plane RP will not lie exactly midway between the centerlines CL-1 and CL-2 when the beam is advanced after punching of the first hole. This is of no consequence, however, since the probe 40 always moves downwardly into contact with the web 14 and always locates the position of the reference plane prior to the punching of the next hole so that the hole will be punched at the proper gage line dimension G in spite of the bowed configuration of the beam.

In certain instances when punching a hole in the upper flange 15 of the I-beam 11, the initial spacing $S_1$ between the reference plane RP and the centerline CL-1 of the upper press 23 is greater than 5.000 inches and results in the counter 52 switching from its "normal" mode to its "reverse" mode as the probe 40 proceeds downwardly and before the probe stops against the web 14. When this condition exists, the counter also switches back from its "reverse" mode to its "normal" mode as the carriage 35 is moved downwardly, This occurs, for example, when the upper centerline CL-1 is initially spaced a distance $S_1$ of 7.000 inches from the reference plane RP of a beam 11 having a web 14 with a thickness TH of 1.000 inch and when a gage line dimension G of 6.000 inches has been dialed into the thumbwheel switches 61 to 64. As the probe 40 moves downwardly through a distance of 4.500 inches, the count C increases from 1.000 to 10.000 to cause the decoder 77 to produce the pulse 10p, toggle the flip-flop FFH and switch the counter 52 to its "reverse" mode. As the probe moves downwardly through its final 2.000 inches and stops against the web 14, the counter counts downwardly and thus the count C decreases to 6.000 which is equal to the quantity 2(S − $S_1$) or 2(10.000 inches − 7.000 inches).

When the one-shot OSD times out and produces its pulse D, the signal SD is at a binary "1" level since the output from the OR gate 95 is high as a result of the AND gate 98 being qualified by the signal A from the flip-flop FFA and the signal H from the toggled flip-flop FFH (see the truth table). Accordingly, the pulse SDC is transmitted from the AND gate 93 and passes through the OR gate 99a to set the flip-flop FFE and initiate downward movement of the carriage 35.

As the carriage 35 moves downwardly through its initial 2.000 inches, the counter 52, being in its "reverse" mode, counts upwardly so that the count C increases from 6.000 to 10.000. At this time, the decoder 77 again produces its pulse 10p to re-toggle the flip-flop FFH, creat the signal H and switch the counter 52 back to its "normal" mode. The counter then starts counting downwardly and, when the carriage 35 has moved through its final distance of 2.000 inches, the count C decreases to 6.000 and becomes equal to the gage line dimension G. The comparator 73 thus produces its pulse 2P which is routed through the qualified AND gate 100 and the OR gate 101 to reset the flip-flop FFE and stop the carriage with the upper centerline CL-1 located 3.000 inches above the reference plane RP and properly positioned with respect to the upper flange 15. Thus, proper positioning is achieved even though the counter 52 twice switched counting modes, first during downward movement of the probe 40 and then during downward travel of the carriage 35.

When punching a hole in the upper flange 15 of the I-beam 11, it is necessary, under certain circumstances, for downward movement of the carriage 35 to continue after the count C first becomes equal to the gage line dimension G and to stop the carriage only when the count C next becomes equal to G. These circumstances prevail when it (i) is necessary to move the carriage downwardly to properly position the upper centerline CL-1 with respect to the upper flange, (ii) when the initial spacing $S_1$ between the upper centerline and the reference plane RP is greater than 5.000 inches and (iii) when the count C is less than the gage line dimension G after the probe 40 has stopped against the web 14 but before the carriage has begun its downward movement.

Assume, for example, that the gage line dimension G is 8.000 inches and that the spacing $S_1$ between the reference plane RP and the centerline CL-1 of the upper press 23 initially is 7.000 inches, the web 14 again having a thickness TH of 1.000 inch. When the probe 40 moves downwardly to engage the web 14, the count C increases from 1.000 to 10.000 as the probe moves through its first 4.500 inches of travel. The decoder 77 thus produces its pulse 10p to make the signal H go high and to switch the counter 52 to its "reverse" mode. Accordingly, the counter counts downwardly as the probe moves downwardly through its final 2.000 inches to engage the web and thus the count C decreases to a value of 6.000. When the one-shot OSD times out to produce the pulse D, the signal SD to the AND gate 93 is high because the OR gate 95 is receiving a binary "1" signal from the AND gate 98 whose inputs are constituted by the signals A and H (see the truth table). Thus, the pulse SDC from the AND gate 93 sets the flip-flop FFE to start the carriage 35 downwardly.

The carriage 35 must, of course, move downwardly through a distance of 3.000 inches to place the upper centerline CL-1 at a distance of G/ 2 of 4.000 inches and, in moving through its first 1.000 inch, the carriage causes the counter 52 to count upwardly to 8.000. With the count C thus being equal to the gage line dimension G, the flip-flop FFE would, if allowed to be reset by the pulse 2P, stop the carriage 35 prematurely with the upper centerline CL-1 in the improper location.

To avoid the foregoing, provision is made to prevent resetting the flip-flop FFE when the carriage 35 has been started downwardly through an initial downward move and the count C becomes equal to the gage line dimension G while the counter 52 is in its "reverse" mode. For this purpose, the pulse D—which effects setting of the flip-flop FFE to start the carriage downwardly—is also routed from the differentiator 91 to an AND gate 125 (FIG. 6b) which controls setting of the flip-flop FFJ. The other input to the AND gate 125 is supplied through an OR gate 126 which is coupled to another AND gate 127 whose input signals constitute the signals A, H and 2B, the latter signal being produced by the comparator 73 when the count C is less than the gage line dimension G.

Now, after final downward movement of the probe 40 but prior to initial downward movement of the carriage 35, the signals A, H and 2B all are at "1" levels and thus the gates 127 and 126 are enabled. When the differentiator 91 produces the pulse D to start the carriage moving downwardly, that pulse passes the qualified AND gate 125 to set the flip-flop FFJ and cause the signal J to go low. Accordingly, when the carriage moves downwardly through such a distance that the count C becomes equal to the gage line dimension G and the pulse 2P is produced by the comparator 73, the AND gate 100 is disqualified and thus the flip-flop FFE cannot be reset to stop the carriage.

When the carriage 35 moves downwardly a distance of 2.000 inches from its initial position, the count C increases from 6.000 to 10.000. At this time, the pulse 10p toggles the flip-flop FFH to make the signal H high once again and to place the counter C in its "normal" mode, the pulse 10p also resetting the flip-flop FFJ. When the carriage moves downwardly an additional 1.000 inch, the count C decreases from 10.000 to 8.000 and again becomes equal to the gage line dimension G so that the pulse 2P again is produced by the comparator 73. At this time, the AND gate 100 is enabled by the signal J and thus the pulse 2P is passed through that gate and the OR gate 101 to reset the flip-flop FFE and stop the carriage with the upper centerline CL-1 properly spaced 4.000 inches above the reference plane RP.

In the three immediately preceding examples, the system functions exactly the same as in the first example once the carriage 35 has been shifted downwardly to the proper position for punching of the hole. That is, the upper punch solenoid UPS is energized to effect punching of the hole, the relay $RC_u$ then is picked up to drive the carriage upwardly, and the counter 52 counts upwardly during movement of the carriage. When the count C reaches 10.000, the pulse 10p causes the relay $RC_u$ to drop out and stop the carriage in a position where the upper and lower centerlines CL-1 and CL-2 are spaced equidistantly from the reference plane RP. The relay $R_u$ then is picked up to retract the probe 40 upwardly and end the cycle.

In each of the cases described above, the carriage 35 initially moved downwardly to reach the proper location for punching the hole 10 in the upper flange 15 of the I-beam 11. There are, however, many instances where the initial relative positioning of the carriage and the beam requires that the carriage initially move upwardly to reach the proper location with respect to the upper flange. To demonstrate, let it be assumed that it is desired to punch a hole at a gage dimension G of 8.000 inches in a beam having a web 14 with a thickness TH of 1.000 inch and that the initial spacing $S_1$ between the reference plane RP and the centerline CL-1 of the upper press 23 is 3.000 inches. Now, as the probe 40 moves downwardly and stops against the web, the count C increases from 1.000 to 6.000. The one-shot OSD times out to cause the pulse D to be routed to the AND gates 93 and 94. At this time, the AND gate 97 is disabled because the count C is less than the gage line dimension G and thus the signal 2A to the gate is low. In addition, the AND gate 98 is disabled because its input signal H is low. Finally, the third AND gate 99 is disabled because the input signals A and H to the gate are low although the input signal 2B is high as a result of the count C being less than the gate line dimension G.

Because the three AND gates 97, 98 and 99 are disabled, the output from the OR gate 95 is at a binary "0" level and, as a result of the inverter 96, the input signal SU to the AND gate 94 is at a "1" level (see the truth table). Thus, when the pulse D arrives at the gate 94, the latter is qualified and transmits a pulse SUC to an AND gate 130 which always is enabled except for special situations to be explained subsequently. The pulse SUC is routed through the AND gate 130 and the OR gate 190 to set the flip-flop FFG, pick up the relay $RC_u$ and initiate upward movement of the carriage 35.

As the carriage 35 moves upwardly, the counter 52—being in its "normal" mode— counts upwardly by two until the carriage has moved 1.000 inches and the count C reaches 8.000 or a value equal to the gage line dimension G. The comparator 73 thus produces the pulse 2P which is routed through the qualified AND gate 110 and the OR gate 111 to reset the flip-flop FFG and stop the carriage with the upper centerline CL-1 positioned the proper distance of 4.000 inches above the reference plane RP.

When the flip-flop FFG resets, the signal G goes high and causes the differentiator 114 to send a pulse through the OR gate 104, the qualified AND gate 105 and the OR gate 106 to set the flip-flop FFN, trigger the one-shot OSF, energize the upper punch solenoid UPS and effect punching of the hole 10. When the one-shot times out, the signal F causes the differentiator 107 to produce a pulse which is routed through the OR gate 109 to set the flip-flop FFG once again and start the carriage 35 moving upwardly. The carrige moves upwardly through a distance of 1.000 inches until the count C increases to 10.000, at which time the decoder 77 produces the pulse 10p. The latter is routed through the qualified AND gate 110 and the OR gate 111 to reset the flip-flop FFG and stop the carriage. It will be noted that the carriage again is stopped in a centered position in which the centerlines CL-1 and CL-2 are spaced equidistantly from the reference plane RP.

When the flip-flop FFG resets, the signal G goes high and the pulse from the differentiator 114 passes the qualified AND gate 115 to reset the flip-flops FFA, FFN and FFT. The signal T thus energizes the relay $R_u$ to retract the probe 40 and end the cycle.

It will be noted that once a hole 10 in the upper flange 15 of a given I-beam 11 has been punched, the carriage 35 is always returned upwardly to a position in which the centerlines CL-1 and CL-2 are spaced equidistantly from the reference plane RP of that I-beam regardless of whether the initial move of the carriage was in an upward or downward direction. If additional holes are to be punched in the upper flange of that particular I-beam, the initial movement of the carriage will always be downwardly since the initial spacings $S_1$ of the upper centerline CL-1 from the reference plane RP is 5.000 inches and since the thumbwheel switches 68 to 71 do not permit the operator to dial in a gage line dimension G equal to or greater than 10.000 inches.

Let it now be assumed that the operator wishes to punch a hole 10 only in the lower flange 16 of an I-beam 11 having a web 14 with a thickness TH of 1.000 inches. Assume further that the gage line dimension G is 4.000 inches, that the initial spacing $S_1$ between the reference plane RP and the centerline CL-1 of the upper press 23 is 4.000 inches and that the initial spacing $S_2$ between the reference plane and the centerline CL-2 of the lower press 24 is 6.000 inches.

To initiate the cycle, the operator momentarily closes the push button switch PS-L so as to trigger the one-shot OSB by way of the OR gate 87 and preset the thickness TH into the counter 52 via the pulse P. When the one-shot times out, the signal B initiates downward movement of the probe 40 in the same manner as before by setting the flip-flop FFT and picking up the relay $R_d$. When the probe moves downwardly 3.500 inches and stops against the web 14, it causes the count C to increase from 1.000 to 8.000, the counter being in its "normal" counting mode as a result of the flip-flop FFH being in its reset state. It will be noted that the count C is equal to the quantity $2(S - S_2)$ or to $2(10.000 - 6.000)$ and thus is related to the distance between the lower centerline CL-2 and the reference plane RP even though the probe measured the distance between the upper centerline CL-1 and the upper surface of the web.

The signal T from the flip-flop FFT triggers the one-shot OSD which, upon timing out, transmits the pulse D to the AND gates 93 and 94. Since the count C is greater than the gage line dimension G, the signal 2B from the comparator 73 to the AND gate 99 is low and thus that gate is disabled. The AND gates 97 and 98 also are disabled since the signal A is low as a result of the flip-flop FFA being in its reset state. According to the truth table, the signal SU thus resides at a binary "1" level and, as a result, the AND gate 94 is enabled and transmits the pulse SUC through the normally enabled AND gate 130 and the OR gate 109 to set the flip-flop FFG and initiate upward movement of the carriage 35.

As the carriage 35 moves upwardly through a distance of one inch, the count C increases from 8.000 to 10.000 since the counter 52 is in its "normal" counting mode. When the count C reaches 10.000, the pulse 10p from the decoder 77 is routed through the gate 113 to toggle the flip-flop FFH and cause the signal H to go to a binary "1" level and switch the counter to its "reverse" mode. The pulse 10p is not effective to reset the flip-flop FFG since the AND gate 110 is disabled as a result of the signal A being high.

As the carriage 35 continues upwardly, the counter 52, being in its reverse mode, counts downwardly until the carriage has moved upwardly an additional distance of 3.000 inches and the count has reduced from 10.000 to 4.000. With the count C thus being equal to the gage line dimension G, the pulse 2P from the comparator 73 passes the qualified AND gate 100 and the OR gate 111 to reset the flip-flop FFG and stop upward movement of the carriage. The signal G causes the differentiator 114 to produce a pulse which is routed through the OR gate 104 but which is precluded from passing the AND gates 105 and 115 since the signal A is low. The pulse is, however, routed to and passes another AND gate 135 (FIG. 6b) which is qualified as a result of receiving a binary "1" signal from an OR gate 136 having one input supplied by the signal A. Upon passing an OR gate 137, the pulse sets a flip-flop FFP whose output signal P goes high to trigger a one-shot OSQ which produces a signal Q to energize the lower punch solenoid LPS and effect punching of the lower flange 16.

After sufficient time has elasped for the punching to be completed, the one-shot OSQ times out and produces a signal Q which causes a differentiator 138 to transmit a pulse through the OR gate 99a to the flip-flop FFE to set the latter and start the carriage 35 moving downwardly. Downward movement of the carriage continues through a distance of 3.000 inches to cause the counter 52 to count upwardly from a count C of 4.000 to a count C of 10.000. At this time, the pulse 10p from the decoder 77 is supplied to an AND gate 139 (FIG. 6b) which is qualified as a result of its other input being supplied from an OR gate 140 having the signals A and N as its inputs. Accordingly, the pulse 10p is supplied through the AND gate 139 and the OR gate 101 to the flip-flop FFE to reset the latter and stop downward movement of the carriage. It will be noted that the carriage again stops with the centerlines CL-1 and CL-2 spaced equidistantly from the reference plane RP.

When the flip-flop FFE resets, the signal E causes the differentiator 103 to produce a pulse which is supplied to an AND gate 141. That gate receives its other input from an OR gate 142 which is enabled as a result of input signals A and P being at high levels. Thus, the pulse from the differentiator 103 passes the AND gate 141 and appears on its output line R/A, R/I, R/N, R/P and R/T to reset the flip-flops A, I, N, P and T if those flip-flops have been set. Upon resetting, the flip-flop FFT picks up the relay $R_u$ to retract the probe 40 upwardly.

If the operator then advances the beam 11 to punch a hole 10 in the lower flange 16 at the same gage dimension G of 4.000 inches, the probe 40 will engage the web 14 after moving downwardly a distance of 4.500 inches (assuming that the beam is straight) and will cause the count C to increase from 1.000 to 10.000. the pulse 10p from the decoder 77 then will toggle the flip-flop FFH to make the signal H high and place the counter 52 in its "reverse" mode. From the truth table, it will be seen that all of the gates 97, 98 and 99 are disqualified and thus the signal SU resides at a binary "1" level when the one-shot OSD times out and the pulse D is supplied to the AND gate 94. Thus, the signal SUC is transmitted to the flip-flop FFG to set the latter and start the carriage 35 upwardly.

Being in its "reverse" mode, the counter 52 counts downwardly as the carriage 35 moves upwardly, the count C decreasing from 10.000 to 4.000 as the carriage travels upwardly through a distance of 3.000 inches and arrives at the proper location for punching the hole. With the count C being equal to the gage line dimension G, the pulse 2P from the comparator 73 is routed through the gates 100 and 111 to reset the flip-flop FFG and stop the carriage. The cycle then proceeds exactly as described in the immediately preceding example.

If the initial spacing between the reference plane RP and the lower centerline CL-2 is greater than 5.000 inches —and if the count C is less than the gage line dimension G after the probe 40 has stopped against the web 14 but before upward travel of the carriage 35 begins, it is necessary to allow the carriage to continue upwardly when the count C first becomes equal to the gage line dimension G and to stop the carriage when C next becomes equal to G. To demonstrate, assume that a hole 10 is to be punched at a gage line dimension G of 8.000 inches in the lower flange 16 of a beam 11 having a web 14 with a thickness TH of 1.000 inches and that the initial spacings $S_1$ and $S_2$ are 3.000 inches and 7.000 inches, respectively.

When the probe 40 moves toward and stops against the web 14, the count C increases from 1.000 to 6.000. The pulse D and the signal SU are supplied to the gate 94 to cause the signal SUC to set the flip-flop FFG and start the carriage upwardly. The pulse D also is transmitted to the AND gate 125 (FIG. 6b), and that gate is enabled from a signal passing through the OR gate 126 from an AND gate 150 having input signals A, H and 2B. Accordingly, the signal from the AND gate 125 sets the flip-flop FFJ so that the signal J goes low to disqualify the AND gate 100.

As soon as the carriage 35 moves upwardly 1.000 inches, the count C reaches 8.000 and becomes equal to the gage line dimension G. The pulse 2P, however, cannot pass the AND gate 100 and thus does not reset the flip-flop FFG and stop the carriage. The carriage thus moves upwardly an additional 1.000 inches to increase the count C from 8.000 to 10.000 and, as a result, the pulse 10p from the decoder 77 resets the flip-flop FFJ and also toggles the flip-flop FFH to switch the counter 52 to its "reverse" mode. With continued upward movement of the carriage through an additional 1.000 inches, the count C reduces from 10.000 to 8.000 and again becomes equal to the gage line dimension G so that the pulse 2P is routed through the now-qualified AND gate 100 to reset the flip-flop FFG and stop the carriage.

The relative initial positioning between the beam 11 and the presses 23 and 24 may be such that the carriage 35 initially moves downwardly rather than upwardly to punch a hole 10 in the lower flange 16. This occurs, for instance, when the gage line dimension G is 8.000 inches, the distances $S_1$ and $S_2$ are 7.000 inches and 3.000 inches, respectively, and the web thickness TH is 1.000 inches.

As the probe 40 moves downwardly, the counter 52 switches from "normal" mode to "reverse" mode and, when the probe stops against the web 14, the counter registers a count C of 6.000 which is equal to the quantity $2S_2$ and which is less than the gage line dimension G. The AND gate 99 thus is qualified so that the signal SD enables the AND gate 93 and causes the pulse SDC to set the flip-flop FFE and start the carriage 35 downwardly. When the carriage moves downwardly through 1.000 inches, the count C increases to 8.000 inches and becomes equal to the gage line dimension G so that the pulse 2P is routed through the AND gate 100 and the OR gate 101 to reset the flip-flop FFE and stop the carriage. The signal E causes the differentiator 103 to produce a pulse which passes the gates 104, 135 and 137 to set the flip-flop FFP, trigger the one-shot OSQ and energize the lower punch solenoid LPS. When the one-shot times out, the pulse from the differentiator 138 sets the flip-flop FFE to cause the carriage to move downwardly until the count C reaches 10.000. At this time, the pulse 10p passes the AND gate 139 and the OR gate 101 to reset the flip-flop FFE and stop the carriage with the centerlines CL-1 and CL-2 spaced equidistantly from the reference plane RP. It will be noted that, when punching only the lower flange 16, the return movement of the carriage always is in a downward direction regardless of whether the carriage initially moved downwardly or upwardly to reach the specified hole location.

An extremely rare situation can arise where the upper centerline CL-1 or the lower centerline CL-2 might be positioned exactly at the location where the hole 10 in the upper flange 15 or the lower flange 16, respectively, is to be punched when the beam 11 is first advanced into position for punching the initial hole. Assume, for example, that a hole is to be punched in the upper flange and that there is a gage line dimension G of 6.000 inches, an initial spacing $S_1$ of 3.000 inches and a web thickness TH of 1.000 inches. The upper centerline CL-1 thus is initially positioned at the exact location where the hole is to be punched.

Now, when the probe 40 advances downwardly and stops against the web 14, the count C increases from 1.000 to 6.000 and becomes equal to the gage line dimension G. The AND gate 97 is disqualified because the signal 2A is low, the AND gate 98 is disqualified because the signal H is low and the AND gate 99 is disqualified because the signals H and 2B are low. Accordingly, the output signal from the OR gate 95 is at a binary "0" level and, because of the inverter 96, the signal SU to the AND gate 94 is at a binary "1" level. Thus, the signal SU and the pulse D applied to the AND gate 94 result in the appearance of the pulse SUC and, unless disabled, that pulse would initiate upward movement of the carriage 35 and result in improper positioning.

To prevent such movement, the AND gate 130 is disqualified and prevents the signal SUC from setting the flip-flop FFG whenever (i) the upper flange 16 is being punched, (ii) the counter 52 is in its "normal" counting mode and (iii) the count C is equal to the gage line dimension G when the probe 40 stops against the web 14. When these conditions prevail, a binary "1" signal is transmitted to the AND gate 130 through an inverter 160 (FIG. 6b), an OR gate 161 and an AND gate 162. The inputs to the latter constitute the signals A and H from the flip-flops FFA and FFH and the signal 2E from the comparator 73, the latter signal being at a "1" level when the count C is equal to the gage line dimension G.

When the upper centerline CL-1 is initially positioned at the proper punching distance with respect to the upper flange 16 at the very beginning of a cycle, the signal A, H and 2E all reside at binary "1" levels when the probe 40 engages the web 14 and thus the AND gate 162 produces a binary "1" output signal IPU. This signal is routed through the OR gate 161 and the invertor 160 and is applied as a binary "0" level signal to the AND gate 130 to disable the latter and prevent the signal SUC from setting the flip-flop FFG and moving the carriage 35 upwardly. The signal IPU also is routed to an AND gate 163 (FIG. 6b) whose other input is constituted from the pulse D from the differentiator 91. Thus, when the probe 40 engages the web 14 and the one-shot OSD times out, the pulse D and the signal IPU enable the AND gate 163 so that the pulse is passed through the OR gate 106 to set the flip-flop FFN and trigger the one-shot OSF. The upper punch solenoid UPS thus is energized to cause the upper flange 15 to be punched immediately and without any movement of the carriage 35 from its initial position. The cycle then is completed in the same manner as described previously.

The AND gate 130 is similarly disabled and an immediate punch signal IPL is produced if the lower centerline CL-2 initially is positioned at the exact location where the first hole 10 is to be punched in the lower flange 16. Thus, an AND gate 164 (FIG. 6b) is coupled to the OR gate 161 and is enabled upon receiving signals A, I, H and 2E, these signals being high when only the lower flange is being punched and when the counter 52 is in its "reverse" mode and is holding a count C equal to the gage line dimension G after the probe 40 stops against the web 14. When the gate 164 is enabled, the signal IPL is routed through the OR gate 161 and the invertor 160 to disable the AND gate 130 and prevent the signal SUC from initiating upward movement of the carriage. In addition, the signal IPL and the pulse D are supplied to an AND gate 165 (FIG. 6b) so that, when the one-shot OSD times out, the pulse D passes the gate 165 and the OR gate 137 to set the flip-flop FFP, trigger the one-shot OSQ, energize the lower punch solenoid OSQ and effect immediate punching of the lower flange 16 before any movement of the carriage 35 takes place.

A further important advantage of the present control system is that it enables vertically alined holes 10 to be punched at the same gage dimension G in both the upper and lower flanges 15 and 16 of an I-beam 11 in a single continuous cycle without need of the probe 40 retracting and then re-advancing after the first hole has been punched and without need of the carriage 35 returning to its centered position after punching of the first hole. To demonstrate, assume that the same conditions prevail as in the very first example given above. That is, assume that the centerlines CL-1 and CL-2 of the presses 23 and 24 are initially spaced distances $S_1$ and $S_2$, respectively, of 4.000 inches and 6.000 inches from the reference plane RP and that the web 14 has a thickness TH of 1.000 inches. Further assume that it is desired to punch a hole 10 both in the upper flange 15 and the lower flange 16 at a gage line dimension G of 6.000 inches so that each hole will be spaced a distance of 3.000 inches from the reference plane.

After dialing in the web thickness TH and the gage line dimension G, the operator momentarily closes the push button switch PS-B. This sets the flip-flop FFI and, by way of a line 170 (FIG. 6a) with an isolating diode 171, also effects setting of the flip-flop FFA. As a result, the one-shot OSB is triggered to preset the thickness TH into the counter 52 and to reset the flip-flop FFH if the latter should happen to have been set at the start of the cycle. When the one-shot OSB times out, it sets the flip-flop FFT to initiate downward movement of the probe 40. As the probe moves downwardly and stops, the counter 52 counts upwardly by two and thus the count increases from 1.000 to 8.000.

Setting of the flip-flop FFT triggers the one-shot OSD which, upon timing out, causes the pulse D to be transmitted to the gates 93 and 94. According to the truth table, the signal SD is at a binary "1" level and thus the pulse SDC is transmitted from the gate 93 to the flip-flop FFE to set the latter and initiate downward movement of the carriage 35. The counter thus counts downwardly and, when the carriage has moved through 1.000 inches to properly position the upper centerline CL-1, the count C reduces to 6.000 and becomes equal to the gage line dimension G. The pulse 2P thus is routed through the gates 100 and 101 to reset the flip-flop FFE and stop the carriage 35.

When the flip-flop FFE is reset, the pulse from the differentiator 103 passes the gates 104, 105 and 106 to set the flip-flop FFN and trigger the one-shot OSF to energize the solenoid UPS and punch the hole in the upper flange 15. After the hole has been punched and the one-shot times out, the pulse from the differentiator 107 sets the flip-flop FFG to start the carriage 35 moving in an upward direction, the lower centerline CL-2 being spaced a distance of 7.000 inches from the reference plane RP prior to upward movement of the carriage. As the carriage moves upwardly a distance of 2.000 inches, the count C increases from 6.000 to 10.000 and thus the counter 52 produces the pulse 10p which toggles the flip-flop FFH and switches the counter to its "reverse" mode. The pulse 10p is prevented from passing the AND gate 110 and resetting the flip-flop FFG since the signal I to the gate is low.

Accordingly, the carriage 35 continues its upward movement and the counter 52 counts downwardly. When the carriage has moved upwardly an additional 2.000 inches, the count C reduces to 6.000 and again becomes equal to the gage dimension G, the lower centerline CL-2 now being spaced 3.000 inches below the reference plane RP and in proper position for punching of the lower flange 16. With the count C equal to the gage line dimension G, the comparator 73 produces the pulse 2P to reset the flip-flop FFG and stop the carriage. The pulse from the differentiator 114 passes the gates 104, 105 and 106 and attempts to set the flip-flop FFN but is of no effect since that flip-flop is already set. The pulse also passes the gate 135 since that gate is enabled by the output of the gate 136 which receives a binary "1" signal from an AND gate 170 whose input signals A, I and N are all high at the time the pulse is produced. Accordingly, the pulse is routed through the gate 137 and sets the flip-flop FFP to trigger the one-shot OSQ and energize the punch solenoid LPS to effect punching of the lower flange 16. When the one-shot times out, the pulse from the differentiator 138 sets the flip-flop FFE to initiate downward movement of the carriage 35. As the carriage moves downwardly, the counter counts upwardly and, when the count C reaches 10.000, the decoder 77 produces the pulse 10p which passes the gates 139 and 101 to reset flip-flop FFE and stop the carriage. The centerlines CL-1 and CL-2 now are each spaced a distance of 5.000 inches from the reference plane RP.

When the flip-flop FFE resets, the pulse from the differentiator 103 passes the AND gate 141 and resets the flip-flops FFA, FFI, FFN, FFP and FFT. Upon resetting, the flip-flops FFT picks up the relay $R_u$ to retract the probe 40 and end the cycle.

Thus, holes can be punched in both the upper and lower flanges 15 and 16 in a single cycle. It should be appreciated that the single cycle operation can take place regardless of whether the initial movement of the carriage 35 is upwardly or downwardly and regardless of the initial spacing of the centerlines CL-1 and CL-2 from the reference plane RP. The hole in the upper flange always is punched first and the cycle initially proceeds as if only a hole were being punched in the upper flange. But, after the upper hole has been punched and when the carriage then returns in an upward direction, the disabled AND gate 110 prevents the pulse 10p from resetting the flip-flop FFG and stopping the carriage when the count C reaches 10.000. Instead, the carriage continues upwardly until the count C again becomes equal to the gage line dimension G and the pulse 2P resets the flip-flop FFG with the lower centerline CL-2 located at the proper punching location. The cycle then proceeds and ends as if only a hole were being punched in the lower flange.

From the foregoing, it will be apparent that the present invention brings to the art new and improved apparatus which enables the presses 23 and 24 to be automatically positioned to punch holes 10 selectively in either the upper or lower flanges 15 or 16 of an I-beam 11 or to punch holes in both flanges in a single cycle. The ability of the counter 52 to count by two enables the press operator in dial in the actual web thickness TH on the thumbwheel switches 61 to 64 and to dial in the actually specified gage line dimension G on the thumbwheel switches 68 to 71. Accordingly, the operator may program the apparatus in terms of the actual and specified dimensions TH and G and need not divide these dimensions by two, thereby easing the burden placed upon the operator and reducing the possibility of error.

Because the counter 52 is capable of switching between "normal" and "reverse" counting modes, the apparatus is able to locate the lower press 24 in the proper position for punching a hole 10 in the lower flange 16 even though the probe 40 engages only the upper surface of the web 14 and does not directly measure the spacing $S_2$ between the lower centerline CL-2 and the reference plane RP. That is to say, the count C which is held by the counter 52 when the probe stops against the web is equal either to the quantity $2(S - S_2)$ or to the quantity $2S_2$, depending upon whether the initial spacing $S_1$ was less than $\frac{1}{2}S$ or was equal to or greater than $\frac{1}{2}S$. Thus, the count is a function of the spacing $S_2$ even though the probe directly measured the distance between the upper centerline CL-1 and the upper surface of the web rather than the distance between the lower centerline CL-2 and the lower surface of the web. If the initial spacing $S_1$ was equal to or greater than $\frac{1}{2}S$, the counter switches from its "normal" mode to its "reverse" mode during movement of the probe so that the count C subsequently will proceed in the proper direction during movement of the carriage. If the initial spacing $S_1$ was less than $\frac{1}{2}S$, the counter switches to its "reverse" mode during movement of the carriage 35 so that the count C will not exceed 10.000 but instead will proceed toward the gage line dimension G. Accordingly, the counter 52, by switching between "normal" and "reverse" modes, enables the probe 40 to be used to effect positioning of the lower press 24 as well as the upper press 23 and eliminates the need of providing a lower probe to directly measure the distance between the centerline CL-2 and the lower surface of the web 14.

To adapt the system to punch the flange 18 (FIG. 2) of the angle iron 12, the operator moves the selector switch wiper 75a to its second position on the contact C-2. This removes the signal on the output line 1 from the terminal 76 of the counter 52 so that the counter will count by one and thus the count C will change by 0.001 for each pulse U or D received on the count up to count down terminals 50 and 51. When the wiper is moved to its second position, the signal on the output line 2 is applied to the gate 90 (FIG. 6a) and, in addition, the signal on the output line 2 is applied to the gate 82 so that the decoder 77 will produce the pulse 8p each time the count C equals 8.000.

Let it be assumed that the horizontal flange 17 (FIG. 2) of the angle iron 12 has a thickness TH of 1.000 inch and that it is desired to punch a hole 10 in the vertical flange 18 at a gage line dimension G of 4.000 inches. It will be recalled that, for an angle iron, the gage line dimension represents the actual distance which the hole is to be spaced from the reference plane RP defined by the lower surface of the horizontal flange. When dealing with an angle iron, the hole is always punched by the upper press 23. Assume, therefore, that the initial spacing $S_1$ between the reference plane RP and the upper centerline Cl-1 is 7.000 inches.

After setting the selector switch wiper 75a to its second position, the press operator dials in the flange thickness TH on the thumbwheel switches 61 to 64 and further dials in the gage line dimension G on the switches 68 to 71. The operator then closes the push button switch PS-U to trigger the one-shot OSB and to cause a pulse from the differentiator 88 to be transmitted through the qualified AND gate 89 and to be supplied to the presetting gates as the pulse P so as to preset the thickness TH into the counter 52, the pulse from the differentiator also resetting flip-flop FFH to place the counter in its "normal" mode. Upon timing out, the one-shot sets the flip-flop FFT to start the probe 40 moving downwardly. The probe moves downwardly through a distance of 6.000 inches before stopping against the flange 17 and, since the counter counts upwardly by one, the count C increases from 1.000 to 7.000.

After the probe 40 has stopped against the flange 17, the one-shot OSD times out so that the pulse D is routed to the gates 93 and 94. According to the truth table, the signal SD is at a "1" level and thus the pulse SDC appears at the output of the gate 93 to set the flip-flop FFE and initiate downward movement of the carriage 35. As the carriage moves downwardly, the counter 52 counts downwardly by one until the carriage has moved downwardly through a distance of 3.000 inches and is positioned with the upper centerline CL-1 properly located 4.000 inches above the reference plane RP. With the count C being reduced from 7.000 to 4.000 and being equal to the gage line dimension G, the comparator 73 produces the pulse 2P which is routed through the gates 100 and 101 to reset the flip-flop FFE and stop the carriage 35. The pulse from the differentiator 103 passes the gates 104, 105 and 106 to set the flip-flop FFN, trigger the one-shot OSF and energize the solenoid UPS to actuate the upper punch 27 and form the hole in the flange 18.

When the one-shot OSF times out, the pulse from the differentiator 107 sets the flip-flop FFG to start the carriage 35 moving upwardly and start the counter 52 counting upwardly. As the carriage moves upwardly through a distance of 4.000 inches, the count C increases from 4.000 to 8.000, the decoder 77 produces the pulse 8p, and the pulse resets the flip-flop FFG to stop the carriage with the upper centerline CL-1 positioned 8.000 inches above the reference plane RP. When the flip-flop FFG resets, the pulse from the differentiator 114 passes the AND gate 115 to reset the flip-flops FFA, FFN and FFT. Upon resetting, the flip-flop FFT energizes the relay $R_u$ to retract the probe 40 and terminate the cycle.

Assume now that the initial spacing $S_1$ between the reference plane RP and the upper centerline CL-1 is 4.000 inches and that the hole 10 in the flange 18 is to be punched at a gage line dimension G of 6.000 inches, the flange 17 having a thickness of 1.000 inch. When the probe 40 moves downwardly and engages the flange 17, the counter 52 registers a count C of 4.000 and, according to the truth table, the signal SU is at a one level so that the gage 94 supplies the pulse SUC to the flip-flop FFG. The carriage 35 thus moves upwardly through a distance of 2.000 inches to cause the count C to increase to a value equal to the gage line dimension. The pulse 2P from the comparator 73 passes the gates 110 and 111 and resets the flip-flop FFG to stop the carriage and cause the pulse from the differentiator 114 to set the flip-flop FFN, trigger the one-shot OSF and energize the solenoid UPS to effect punching of the flange 18. When the one-shot times out, the pulse from the differentiator 107 sets the flip-flop FFG once again to move the carriage upwardly an additional 2.000 inches and to cause the count to increase to 8.000. The pulse 8p from the decoder 77 passes the gate 111 and resets the flip-flop FFG to stop the carriage 8.000 inches above the reference plane RP and, when that flip-flop resets, the pulse from the differentiator 114 resets the flip-flop FFT to effect retraction of the probe 40 and end the cycle.

When dealing with an angle iron 12, the carriage 35 always moves upwardly after punching a hole and always stops with the upper centerline CL-1 positioned a distance $S_1$ of 8.000 inches above the reference plane RP. Since the counter 52 counts by one, the count C accurately reflects the fact that the entire thickness TH of the flange 17 must be taken into account to determine the distance between the upper centerline CL-1 and the reference plane RP, and further reflects the fact that the gage line dimension G represents the actual spacing of the hole from the reference plane rather than twice the actual spacing as in the case of an I-beam. Those of ordinary skill in the art will appreciate that the procedure followed in punching the angle iron also could be followed in punching a channel which is supported on the conveyor 33 with its web resting on the conveyor and with its flanges projecting upwardly.

To punch a hole in the flange 19 of the channel 13 when the latter is positioned with its flanges projecting downwardly as shown in FIG. 3, the operator places the selector switch wiper 75a in its third position against the contact C-3. This leaves the counter 52 in its count by one mode and enables the gate 86 (FIG. 5) so that the pulse 5p will be produced when the count C reaches 5.000. In addition, the signal on the output line 3 is supplied to an AND gate 175 (FIG. 6a) which is adapted to receive the pulse from the differentiator 88 when the one-shot OSB is triggered. When the gate 175 is enabled, it supplies a pulse Z which is applied to a terminal 176 of the counter 52 to clear the counter and to reduce the count C to zero.

Punching of a channel 13 with upwardly projecting flanges 19 is always effected with the lower press 24 so let it be assumed that the lower centerline CL-2 initially is spaced downwardly a distance $S_2$ of 3.000 inches from the reference plane RP, the spacing $S_1$ thus being 7.000 inches. Further assume that the hole 10 is to be punched in the flange 19 at a gage line dimension G of 4.000 inches. It will be remembered that, when dealing with the channel 13, the gage line dimension specifies the actual distance of the hole from the reference plane RP and that the reference plane is defined by the upper surface of the web 20. Since that surface is the surface which is actually engaged by the probe 40, the thickness TH of the web has no bearing on the distance through which the probe moves to determine the initial position of the presses and thus need not be taken into account.

After placing the selector switch wiper 75a in its third position, the operator dials in the gage line dimension G on the switches 68 to 71 and closes the switch PS-L. When the one-shot OSB triggers, the pulse from the differentiator 88 is routed through the AND gate 175 to produce the pulse Z and clear the count C to zero. The flip-flop FFT then is set and initiates downward movement of the probe 40. The counter 52 counts upwardly by one and, when the probe has moved through 5.000 inches, the pulse 5p is routed through the gate 113 to toggle the flip-flop FFH and switch the counter to its "reverse" mode. Thus, the count C reduces to 3.000 after the probe moves downwardly an additional 2.000 inches and stops against the web 20.

When the one-shot OSD times out, the signal SD is high (see the truth table) and thus the pulse SDC is transmitted from the gate 93 to set the flip-flop FFE and start the carriage 35 downwardly. The counter 52 counts upwardly as the carriage moves downwardly and thus the count C reaches 4.000 and becomes equal to the gage line dimension G when the carriage has advanced through 1.000 inch and the lower centerline CL-2 has arrived at the proper position for punching of the hole. The pulse 2P then is supplied from the comparator 73 to the flip-flop FFE to reset the latter and stop the carriage. Upon resetting, the flip-flop FFE effects setting of the flip-flop FFP, triggering of the one-shot OSQ and the energization of the solenoid LPS to punch the flange 19.

When the one-shot OSQ times out, the pulse from the differentiator 138 sets the flip-flop FFE once again to move the carriage downwardly 1.000 inch and increase the count C to 5.000. The pulse 5p then is routed to the flip-flop FFE through the gate 101 to reset the flip-flop and stop the carriage with each of the centerlines CL-1 and CL-2 spaced equidistantly or 5.000 inches from the reference plane RP. When the flip-flop resets, the pulse from the differentiator 103 passes the qualified AND gate 141 and resets the flip-flop FFT (and the other set flip-flops) to retract the probe 40 and complete the cycle.

When punching the channel 13, the initial spacing $S_1$ and $S_2$ may be such that the counter 52 does not switch modes during movement of the probe 40 but then switches during movement of the carriage 35. In such an instance, the system functions much the same as when punching the lower flange of an I-beam except that the initial count is zero, the counter counts by one and switches modes when the count reaches 5.000 and, after punching of the hole, the carriage returns downwardly until the count again reaches 5.000. The carriage always returns in a downward direction and, after the first hole has been punched, the initial move of the carriage is always in an upward direction.

From the foregoing, it will be apparent that the system can properly position the presses 23 and 24 with respect to I-beams 11, angle irons 12 and channels 13 and also can position the presses with respect to a channel whose flanges project upwardly. Those skilled in the art will appreciate that different means can be used in place of the various flip-flops, gates and relays and that the system can be adapted for programming from a numerical control, a computer or a microprocessor. For example, information pertaining to the thickness TH and the gate dimension G could be contained on a punched tape to eliminate the need for the operator to set the thumbwheel switches 61 to 64 and 68 to 71, Also, advance of the conveyor and initiation of the punching cycle can be effected automatically.

We claim:

1. Apparatus for forming holes in the upright flange of an elongated structural member having a generally horizontal web joined to said flange, said apparatus comprising a generally vertically movable carriage, a tool mounted on said carriage and operable when actuated to form a hole in said flange, a probe movable vertically relative to said carriage, first mechanism selectively operable to move said probe from a first position spaced vertically from said web to a second position in contact with said web, a reversible counter, means responsive to movement of said probe for causing the count held by said counter to change by a value which is a function of the vertical distance traveled by said probe in moving from said first position to said second position, second mechanism automatically operable to move said carriage vertically after said probe has moved to said second position, said means being responsive to movement of said carriage for causing the count held by said counter to change by a value which is a function of the vertical distance traveled by said carriage, means for automatically stopping said carriage when the count held by said counter coincides with a preselected gage value representative of the desired vertical distance of said hole from a predetermined horizontal reference plane, and means for actuating said tool after said carriage has stopped.

2. Apparatus as defined in claim 1 further including means for causing said count to change by a predetermined amount each time said probe or said carriage moves through a predetermined increment and selectively operable to cause said count to change by twice said predetermined amount each time said probe or said carriage moves through said predetermined increment.

3. Apparatus as defined in claim 2 further including means selectively operable prior to movement of said probe to establish said count at a predetermined initial value which is a function of the vertical thickness of said web, and means selectively operable prior to movement of said probe to establish said count at an alternative predetermined initial value which is unrelated to the vertical thickness of said web.

4. Apparatus as defined in claim 1 for causing said count to change in one direction as said probe initially travels from said first position toward said second position and, if said count reaches a predetermined value before said probe reaches said second position, to cause said count to change in the reverse direction as said probe finally travels to said second position.

5. Apparatus as defined in claim 4 further including means for causing said count to change in one direction during initial travel of said carriage and, if said count reaches said predetermined value before coinciding with said gage value, to cause said count to change in the other direction during continued movement of said carriage.

6. Apparatus as defined in claim 5 further including means for preventing stopping of said carriage and for allowing said carriage to continue to move when said count first coincides with said gage value if the initial spacing between said tool and said reference plane was greater than one-half said predetermined value prior to initial movement of said carriage and if said count was less than said gage value when said probe stopped in said second position, said last-mentioned means causing said carriage to stop when said count next coincides with said gage value.

7. Apparatus as defined in claim 5 in which said second mechanism causes said carriage to move after said tool has been actuated, and means for automatically stopping said carriage when said count coincides with said predetermined value.

8. Apparatus as defined in claim 7 further including means selectively operable to change said predetermined value.

9. Apparatus as defined in claim 1 further including means for causing said second mechanism to move said carriage in one direction if said count is greater than said gage value when said probe stops in said second position and for causing said second mechanism to move said carriage in the opposite direction if said count is less than said gage value when said probe stops in said second position.

10. Apparatus as defined in claim 1 further including means for preventing movement of said carriage if the initial spacing between said tool and said reference plane coincides with said gage value, and means for causing actuation of said tool immediately after said probe stops in said second position if said carriage is prevented from moving.

11. Apparatus for forming a hole in the upright flange of an elongated structural member having a generally horizontal web joined to said flange, said apparatus comprising a generally vertically movable carriage, a tool mounted on said carriage and operable when actuated to form a hole in said flange, means for holding a selected number representative of the desired vertical distance of said hole from a predetermined horizontal reference plane located within the space occupied by said web, a probe movable vertically relative to said carriage, first mechanism selectively operable to move said probe from a first position spaced vertically from said web to a second position in contact with said web, a reversible counter, means responsive to movement of said carriage and also responsive to movement of said probe relative to said carriage to cause the count held by said counter to change by (i) a value which is a function of the distance traveled by said carriage whenever the latter is moved and (ii) a value which is a function of the distance traveled by said probe in moving relative to said carriage from said first position to said second position, means for causing said count to change in one direction as said probe initially travels from said first position toward said second position and, if said count reaches a predetermined value before said probe reaches said second position, to cause said count to change in the other direction as said probe finally travels to said second position, second mechanism automatically operable after said probe has stopped in said second position to move said carriage in one direction or the other depending upon whether said count is greater or less than said number when said probe has stopped in said second position, means for causing said count to change in one direction during initial travel of said carriage and, if said count reaches said predetermined value before coinciding with said number, to cause said count to change in the other direction during continued travel of said carriage, means for automatically stopping said carriage when said count coincides with said number, and means for actuating said tool after said carriage has stopped.

12. Apparatus as defined in claim 11 in which said structural member in an I-beam and in which said reference plane bisects said web, said first-mentioned means holding a number which is equal to twice the desired vertical distance of said hole from said reference plane, means for causing said counter to initially hold a count which is equal to the vertical thickness of said web, said responsive means causing said count to change by (i) a value which is equal to twice the distance traveled by said carriage whenever the latter is moved and (ii) a value which is equal to twice the distance traveled by said probe in moving relative to said carriage from said first position to said second position.

13. Apparatus as defined in claim 11 in which said reference plane coincides with the lower surface of said web and in which said probe moves downwardly to contact said web, said first-mentioned means holding a number which is equal to the desired vertical distance of said hole from said reference plane, means for causing said counter to initially hold a count which is equal to the vertical thickness of said web, said responsive means causing said count to change by (i) a value which is equal to the distance traveled by said carriage whenever the latter is moved and (ii) a value which is equal to the distance traveled by said probe in moving relative to said carriage from said first position to said second position.

14. Apparatus as defined in claim 11 in which said reference plane coincides with the upper surface of said web and in which said probe moves downwardly to contact said web, said first-mentioned means holding a number which is equal to the desired vertical distance of said hole from said reference plane, means for causing said counter to initially hold a count which is unrelated to the vertical thickness of said web, said responsive means causing said count to change by (i) a value which is equal to the distance traveled by said carriage whenever the latter is moved and (ii) a value which is equal to the distance traveled by said probe in moving relative to said carriage from said first position to said second position.

15. Apparatus for forming holes in the upright flange of an elongated I-beam having a generally horizontal web joined to said flange, said apparatus comprising a generally vertically movable carriage, a tool mounted on said carriage and operable when actuated to form a hole in said flange, a probe movable vertically relative to said carriage, first mechanism selectively operable to move said probe from a first position spaced vertically from said web to a second position in contact with said web, second mechanism automatically operable to move said carriage vertically after said probe has moved to said second position, a reversible counter, means for causing said counter to initially hold a count which is a function of the vertical thickness of said web, means responsive to movement of said probe for causing said count to change by a value which coincides with twice the distance traveled by said probe in moving from said first position to said second position, said means also being responsive to movement of said carriage and causing said count to change by a value which coincides with twice the vertical distance traveled by said carriage, means for holding a number which is a function of twice the desired vertical distance of said hole from a predetermined horizontal reference plane which bisects said web, means for automatically stopping said carriage when said count reaches a value which coincides with said number, and means for actuating said tool after said carriage has stopped.

16. Apparatus as defined in claim 15 for causing said count to change in one direction as said probe initially travels from said first position toward said second position and, if said count reaches a predetermined value before said probe reaches said second position, to cause said count to change in the reverse direction as said probe finally travels to said second position.

17. Apparatus as defined in claim 16 further including means for causing said count to change in one direction during initial travel of said carriage and, if said count reaches said predetermined value before coinciding with said number, to cause said count to change in the other direction during continued movement of said carriage.

18. Apparatus as defined in claim 17 further including means for preventing stopping of said carriage and for allowing said carriage to continue to move when said count first coincides with said number if the initial spacing between said tool and said reference plane was greater than one-half said predetermined value prior to initial movement of said carriage and if said count was less than said number when said probe stopped in said second position, said last-mentioned means causing said carriage to stop when said count next coincides with said number.

19. Apparatus as defined in claim 15 further including means for causing said second mechanism to move said carriage in one direction if said count is greater than said number when said probe stops in said second position and for causing said second mechanism to move said carriage in the opposite direction if said count is less than said number when said probe stops in said second position.

20. Apparatus as defined in claim 15 in which said flange projects upwardly from said web, and means for causing said second mechanism to move said carriage downwardly if said count is greater than said number when said probe stops in said second position and for causing said second mechanism to move said carriage upwardly if said count is less than said number when said probe stops in said second position.

21. Apparatus as defined in claim 15 in which said flange projects downwardly from said web, and means for causing said second mechanism to move said carriage upwardly if said count is greater than said number when said probe stops in said second position and for causing said second mechanism to move said carriage downwardly if said count is less than said number when said probe stops in said second position.

22. Apparatus for forming a pair of vertically alined holes in the upper and lower upright flanges of an elongated I-beam having a web joined to and extending generally horizontally from said flanges, said holes being spaced equidistantly from a predetermined horizontal reference plane which bisects said web, said apparatus comprising a generally vertically movable carriage, upper and lower punch presses mounted on said carriage and operable when actuated to form holes in said upper and lower flanges, respectively, a probe movable vertically relative to said carriage, first mechanism selectively operable to move said probe from a first position spaced vertically from said web to a second position in contact with said web, a reversible counter, means for causing said counter to initially hold a count which coincides with the vertical thickness of said web, means for holding a number which coincides with twice the desired vertical distance of either of said holes from said reference plane, means responsive to movement of said carriage and also responsive to movement of said probe relative to said carriage to cause said count to change by (i) a value which coincides with twice the distance traveled by said carriage whenever the latter is moved and (ii) a value which coincides with twice the distance traveled by said probe whenever the latter is moved relative to said carriage, means for causing said count to change in one direction as said probe initially travels from said first position toward said second position and, if said count reaches a predetermined value before said probe reaches said second position, to cause said count to change in the other direction as said probe finally travels to said second position, second mechanism automatically operable after said probe has stopped in said second position to move said carriage in one direction or the other depending upon whether said count is greater or less than said number when said probe has stopped in said second position, means for causing said count to change in one direction during initial travel of said carriage and, if said count reaches said predetermined value before coinciding with said number, to cause said count to change in the other direction during continued travel of said carriage, means for automatically stopping said carriage when said count coincides with said number, means for actuating one of said punch presses after said carriage has stopped thereby to punch a hole in one of said flanges, means for thereafter moving said carriage and for causing said carriage to stop when said count again coincides with said number, and means for thereafter actuating said other punch press to punch a hole in the other of said flanges.

23. Apparatus as defined in claim 22 in which said second mechanism again causes said carriage to move after said other press has been actuated, and means for automatically stopping said carriage when said count coincides with said predetermined value.

* * * * *